United States Patent
Van Assche

(10) Patent No.: US 11,003,838 B2
(45) Date of Patent: May 11, 2021

(54) SYSTEMS AND METHODS FOR MONITORING POST TRANSLATION EDITING

(75) Inventor: Gert Van Assche, Neerlinter (BE)

(73) Assignee: SDL Inc., Wakefield, MA (US)

( * ) Notice: Subject to any disclaimer, the term of this patent is extended or adjusted under 35 U.S.C. 154(b) by 0 days.

(21) Appl. No.: 13/089,202

(22) Filed: Apr. 18, 2011

(65) Prior Publication Data

US 2012/0265711 A1    Oct. 18, 2012

(51) Int. Cl.
| | | |
|---|---|---|
| G06F 3/041 | (2006.01) | |
| G06F 40/166 | (2020.01) | |
| G06Q 10/10 | (2012.01) | |
| G06F 11/34 | (2006.01) | |
| G06Q 10/06 | (2012.01) | |

(52) U.S. Cl.
CPC ........ *G06F 40/166* (2020.01); *G06F 11/3409* (2013.01); *G06Q 10/063112* (2013.01); *G06Q 10/10* (2013.01); *G06Q 10/1091* (2013.01)

(58) Field of Classification Search
CPC .............. G06Q 30/0283; G06Q 30/04; G06Q 30/0206; G06Q 10/1091; G06Q 10/10; H04L 12/1432; G06F 40/166; G06F 11/3409
USPC ...................... 705/7.38, 7.39, 7.41; 715/202
See application file for complete search history.

(56) References Cited

U.S. PATENT DOCUMENTS

| | | |
|---|---|---|
| 4,055,907 A | 11/1977 | Henson |
| 4,502,128 A | 2/1985 | Okajima et al. |
| 4,509,137 A | 4/1985 | Yoshida |
| 4,599,691 A | 7/1986 | Sakaki et al. |
| 4,615,002 A | 9/1986 | Innes |
| 4,661,924 A | 4/1987 | Okamoto et al. |
| 4,787,038 A | 11/1988 | Doi et al. |
| 4,791,587 A | 12/1988 | Doi |
| 4,800,522 A | 1/1989 | Miyao et al. |
| 4,814,987 A | 3/1989 | Miyao et al. |
| 4,942,526 A | 7/1990 | Okajima et al. |

(Continued)

FOREIGN PATENT DOCUMENTS

| | | |
|---|---|---|
| CA | 2408819 | 11/2006 |
| CA | 2475857 | 12/2008 |

(Continued)

OTHER PUBLICATIONS

Proz.com, Rates for proofreading versus Translating, http://www.proz.com/forum/business_issues/202-rates_for_proofreading_versus_translating.html, Apr. 23, 2009, retrieved Jul. 13, 2012.*

(Continued)

*Primary Examiner* — George Chen
*Assistant Examiner* — Freda A Nelson
(74) *Attorney, Agent, or Firm* — Carr & Ferrell LLP

(57) ABSTRACT

Systems and methods for determining a risk-reduced word price for editing. The editing can be of a document, for example, that has been translated by a human or a machine. A system and method may include providing to one or more preferred editors a first portion of editing jobs from a batch job. In some aspects, the system and method may include receiving an editing time of the one or more preferred editors editing the first portion of editing jobs. In further aspects, the system and method can include calculating a word price for editing a remaining portion of editing jobs of the batch job based on the editing time.

20 Claims, 6 Drawing Sheets

(56) References Cited

U.S. PATENT DOCUMENTS

| | | | |
|---|---|---|---|
| 4,980,829 A | 12/1990 | Okajima et al. | |
| 5,020,112 A | 5/1991 | Chou | |
| 5,088,038 A | 2/1992 | Tanaka et al. | |
| 5,091,876 A | 2/1992 | Kumano et al. | |
| 5,146,405 A | 9/1992 | Church | |
| 5,167,504 A | 12/1992 | Mann | |
| 5,175,684 A | 12/1992 | Chong | |
| 5,181,163 A | 1/1993 | Nakajima et al. | |
| 5,212,730 A | 5/1993 | Wheatley et al. | |
| 5,218,537 A | 6/1993 | Hemphill et al. | |
| 5,220,503 A | 6/1993 | Suzuki et al. | |
| 5,267,156 A | 11/1993 | Nomiyama | |
| 5,268,839 A | 12/1993 | Kaji | |
| 5,275,569 A | 1/1994 | Watkins | |
| 5,295,068 A | 3/1994 | Nishino et al. | |
| 5,302,132 A | 4/1994 | Corder | |
| 5,311,429 A | 5/1994 | Tominaga | |
| 5,387,104 A | 2/1995 | Corder | |
| 5,408,410 A | 4/1995 | Kaji | |
| 5,432,948 A | 7/1995 | Davis et al. | |
| 5,442,546 A | 8/1995 | Kaji et al. | |
| 5,458,425 A * | 10/1995 | Torok | B41J 5/10 400/486 |
| 5,477,450 A | 12/1995 | Takeda et al. | |
| 5,477,451 A | 12/1995 | Brown et al. | |
| 5,488,725 A | 1/1996 | Turtle et al. | |
| 5,495,413 A | 2/1996 | Kutsumi et al. | |
| 5,497,319 A | 3/1996 | Chong et al. | |
| 5,510,981 A | 4/1996 | Berger et al. | |
| 5,528,491 A | 6/1996 | Kuno et al. | |
| 5,535,120 A | 7/1996 | Chong et al. | |
| 5,541,836 A | 7/1996 | Church et al. | |
| 5,541,837 A | 7/1996 | Fushimoto | |
| 5,548,508 A | 8/1996 | Nagami | |
| 5,587,902 A | 12/1996 | Kugimiya | |
| 5,644,774 A | 7/1997 | Fukumochi et al. | |
| 5,675,815 A | 10/1997 | Yamauchi et al. | |
| 5,687,383 A | 11/1997 | Nakayama et al. | |
| 5,696,980 A | 12/1997 | Brew | |
| 5,724,593 A | 3/1998 | Hargrave, III et al. | |
| 5,752,052 A | 5/1998 | Richardson et al. | |
| 5,754,972 A | 5/1998 | Baker et al. | |
| 5,761,631 A | 6/1998 | Nasukawa | |
| 5,761,689 A | 6/1998 | Rayson et al. | |
| 5,768,603 A | 6/1998 | Brown et al. | |
| 5,779,486 A | 7/1998 | Ho et al. | |
| 5,781,884 A | 7/1998 | Pereira et al. | |
| 5,794,178 A | 8/1998 | Caid et al. | |
| 5,805,832 A | 9/1998 | Brown et al. | |
| 5,806,032 A | 9/1998 | Sproat | |
| 5,819,265 A | 10/1998 | Ravin et al. | |
| 5,826,219 A | 10/1998 | Kutsumi | |
| 5,826,220 A | 10/1998 | Takeda et al. | |
| 5,845,143 A | 12/1998 | Yamauchi et al. | |
| 5,848,385 A | 12/1998 | Poznanski et al. | |
| 5,848,386 A | 12/1998 | Motoyama | |
| 5,850,561 A | 12/1998 | Church et al. | |
| 5,855,015 A | 12/1998 | Shoham | |
| 5,864,788 A | 1/1999 | Kutsumi | |
| 5,867,811 A | 2/1999 | O'Donoghue | |
| 5,870,706 A | 2/1999 | Alshawi | |
| 5,893,134 A | 4/1999 | O'Donoghue et al. | |
| 5,903,858 A | 5/1999 | Saraki | |
| 5,907,821 A | 5/1999 | Kaji et al. | |
| 5,909,681 A | 6/1999 | Passera et al. | |
| 5,917,944 A | 6/1999 | Wakisaka et al. | |
| 5,930,746 A | 7/1999 | Ting | |
| 5,960,384 A | 9/1999 | Brash | |
| 5,963,205 A | 10/1999 | Sotomayor | |
| 5,966,685 A | 10/1999 | Flanagan et al. | |
| 5,966,686 A | 10/1999 | Heidorn et al. | |
| 5,983,169 A | 11/1999 | Kozma | |
| 5,987,402 A | 11/1999 | Murata et al. | |
| 5,987,404 A | 11/1999 | Della Pietra et al. | |
| 5,991,710 A | 11/1999 | Papineni et al. | |
| 5,995,922 A | 11/1999 | Penteroudakis et al. | |
| 6,018,617 A | 1/2000 | Sweitzer et al. | |
| 6,031,984 A | 2/2000 | Walser | |
| 6,032,111 A | 2/2000 | Mohri | |
| 6,047,252 A | 4/2000 | Kumano et al. | |
| 6,064,819 A | 5/2000 | Franssen et al. | |
| 6,064,951 A | 5/2000 | Park et al. | |
| 6,073,143 A | 6/2000 | Nishikawa et al. | |
| 6,077,085 A | 6/2000 | Parry et al. | |
| 6,092,034 A | 7/2000 | McCarley et al. | |
| 6,119,077 A | 9/2000 | Shinozaki | |
| 6,119,078 A | 9/2000 | Kobayakawa et al. | |
| 6,131,082 A | 10/2000 | Hargrave, III et al. | |
| 6,161,082 A | 12/2000 | Goldberg et al. | |
| 6,182,014 B1 | 1/2001 | Kenyon et al. | |
| 6,182,026 B1 | 1/2001 | Tillmann et al. | |
| 6,182,027 B1 | 1/2001 | Nasukawa et al. | |
| 6,185,524 B1 | 2/2001 | Carus et al. | |
| 6,205,456 B1 | 3/2001 | Nakao | |
| 6,206,700 B1 | 3/2001 | Brown et al. | |
| 6,223,150 B1 | 4/2001 | Duan et al. | |
| 6,233,544 B1 | 5/2001 | Alshawi | |
| 6,233,545 B1 | 5/2001 | Datig | |
| 6,233,546 B1 | 5/2001 | Datig | |
| 6,236,958 B1 | 5/2001 | Lange et al. | |
| 6,269,351 B1 | 7/2001 | Black | |
| 6,275,789 B1 | 8/2001 | Moser et al. | |
| 6,278,967 B1 | 8/2001 | Akers et al. | |
| 6,278,969 B1 | 8/2001 | King et al. | |
| 6,285,978 B1 | 9/2001 | Bernth et al. | |
| 6,289,302 B1 | 9/2001 | Kuo | |
| 6,304,841 B1 | 10/2001 | Berger et al. | |
| 6,311,152 B1 | 10/2001 | Bai et al. | |
| 6,317,708 B1 | 11/2001 | Witbrock et al. | |
| 6,327,568 B1 | 12/2001 | Joost | |
| 6,330,529 B1 | 12/2001 | Ito | |
| 6,330,530 B1 | 12/2001 | Horiguchi et al. | |
| 6,356,864 B1 | 3/2002 | Foltz et al. | |
| 6,360,196 B1 | 3/2002 | Poznanski et al. | |
| 6,389,387 B1 | 5/2002 | Poznanski et al. | |
| 6,393,388 B1 | 5/2002 | Franz et al. | |
| 6,393,389 B1 | 5/2002 | Chanod et al. | |
| 6,415,250 B1 | 7/2002 | van den Akker | |
| 6,460,015 B1 | 10/2002 | Hetherington et al. | |
| 6,470,306 B1 | 10/2002 | Pringle et al. | |
| 6,473,729 B1 | 10/2002 | Gastaldo et al. | |
| 6,473,896 B1 | 10/2002 | Hicken et al. | |
| 6,480,698 B2 | 11/2002 | Ho et al. | |
| 6,490,549 B1 | 12/2002 | Ulicny et al. | |
| 6,498,921 B1 | 12/2002 | Ho et al. | |
| 6,502,064 B1 | 12/2002 | Miyahira et al. | |
| 6,529,865 B1 | 3/2003 | Duan et al. | |
| 6,535,842 B1 | 3/2003 | Roche et al. | |
| 6,587,844 B1 | 7/2003 | Mohri | |
| 6,598,046 B1 | 7/2003 | Goldberg et al. | |
| 6,604,101 B1 | 8/2003 | Chan et al. | |
| 6,609,087 B1 | 8/2003 | Miller et al. | |
| 6,647,364 B1 | 11/2003 | Yumura et al. | |
| 6,691,279 B2 | 2/2004 | Yoden et al. | |
| 6,704,741 B1 | 3/2004 | Lively, Jr. et al. | |
| 6,745,161 B1 | 6/2004 | Arnold et al. | |
| 6,745,176 B2 | 6/2004 | Probert, Jr. et al. | |
| 6,757,646 B2 | 6/2004 | Marchisio | |
| 6,778,949 B2 | 8/2004 | Duan et al. | |
| 6,782,356 B1 | 8/2004 | Lopke | |
| 6,810,374 B2 | 10/2004 | Kang | |
| 6,848,080 B1 | 1/2005 | Lee et al. | |
| 6,857,022 B1 | 2/2005 | Scanlan | |
| 6,885,985 B2 | 4/2005 | Hull | |
| 6,901,361 B1 | 5/2005 | Portilla | |
| 6,904,402 B1 | 6/2005 | Wang et al. | |
| 6,910,003 B1 | 6/2005 | Arnold et al. | |
| 6,952,665 B1 | 10/2005 | Shimomura et al. | |
| 6,983,239 B1 | 1/2006 | Epstein | |
| 6,993,473 B2 | 1/2006 | Cartus | |
| 6,996,518 B2 | 2/2006 | Jones et al. | |
| 6,996,520 B2 | 2/2006 | Levin | |
| 6,999,925 B2 | 2/2006 | Fischer et al. | |
| 7,013,262 B2 | 3/2006 | Tokuda et al. | |

(56) References Cited

U.S. PATENT DOCUMENTS

| | | |
|---|---|---|
| 7,016,827 B1 | 3/2006 | Ramaswamy et al. |
| 7,016,977 B1 | 3/2006 | Dunsmoir et al. |
| 7,024,351 B2 | 4/2006 | Wang |
| 7,031,911 B2 | 4/2006 | Zhou et al. |
| 7,050,964 B2 | 5/2006 | Menzes et al. |
| 7,054,803 B2 | 5/2006 | Eisele |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 | 3/2007 | Okura et al. |
| 7,197,451 B1 | 3/2007 | Carter et al. |
| 7,200,550 B2 | 4/2007 | Menezes et al. |
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,295,963 B2 | 11/2007 | Richardson et al. |
| 7,302,392 B1 | 11/2007 | Thenthiruperai et al. |
| 7,319,949 B2 | 1/2008 | Pinkham |
| 7,328,156 B2 | 2/2008 | Meliksetian et al. |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |
| 7,383,542 B2 | 6/2008 | Richardson et al. |
| 7,389,222 B1 | 6/2008 | Langmead et al. |
| 7,389,234 B2 | 6/2008 | Schmid et al. |
| 7,403,890 B2 | 7/2008 | Roushar |
| 7,409,332 B2 | 8/2008 | Moore |
| 7,409,333 B2 | 8/2008 | Wilkinson et al. |
| 7,447,623 B2 | 11/2008 | Appleby |
| 7,451,125 B2 | 11/2008 | Bangalore |
| 7,454,326 B2 | 11/2008 | Marcu et al. |
| 7,496,497 B2 | 2/2009 | Liu |
| 7,533,013 B2 | 5/2009 | Marcu |
| 7,536,295 B2 | 5/2009 | Cancedda et al. |
| 7,546,235 B2 | 6/2009 | Brockett et al. |
| 7,552,053 B2 | 6/2009 | Gao et al. |
| 7,565,281 B2 | 7/2009 | Appleby |
| 7,574,347 B2 | 8/2009 | Wang |
| 7,580,828 B2 | 8/2009 | D'Agostini |
| 7,580,830 B2 | 8/2009 | Al-Onaizan et al. |
| 7,584,092 B2 | 9/2009 | Brockett et al. |
| 7,587,307 B2 | 9/2009 | Cancedda et al. |
| 7,620,538 B2 | 11/2009 | Marcu et al. |
| 7,620,632 B2 | 11/2009 | Andrews |
| 7,624,005 B2 | 11/2009 | Koehn et al. |
| 7,624,020 B2 | 11/2009 | Yamada et al. |
| 7,627,479 B2 | 12/2009 | Travieso et al. |
| 7,636,656 B1 | 12/2009 | Nieh |
| 7,680,646 B2 | 3/2010 | Lux-Pogodalla et al. |
| 7,689,405 B2 | 3/2010 | Marcu |
| 7,698,124 B2 | 4/2010 | Menezes et al. |
| 7,698,125 B2 | 4/2010 | Graehl et al. |
| 7,707,025 B2 | 4/2010 | Whitelock |
| 7,711,545 B2 | 5/2010 | Koehn |
| 7,716,037 B2 | 5/2010 | Precoda et al. |
| 7,801,720 B2 | 9/2010 | Satake et al. |
| 7,813,918 B2 | 10/2010 | Muslea et al. |
| 7,822,596 B2 | 10/2010 | Elgazzar et al. |
| 7,925,494 B2 | 4/2011 | Cheng et al. |
| 7,957,953 B2 | 6/2011 | Moore |
| 7,974,833 B2 | 7/2011 | Soricut et al. |
| 7,974,843 B2 | 7/2011 | Schneider |
| 7,974,976 B2 | 7/2011 | Yahia et al. |
| 7,983,897 B2 | 7/2011 | Chin et al. |
| 8,060,360 B2 | 11/2011 | He |
| 8,145,472 B2 | 3/2012 | Shore et al. |
| 8,214,196 B2 | 7/2012 | Yamada et al. |
| 8,219,382 B2 | 7/2012 | Kim et al. |
| 8,234,106 B2 | 7/2012 | Marcu et al. |
| 8,244,519 B2 | 8/2012 | Bicici et al. |
| 8,249,854 B2 | 8/2012 | Nikitin et al. |
| 8,265,923 B2 | 9/2012 | Chatterjee et al. |
| 8,275,600 B2 | 9/2012 | Bilac et al. |
| 8,296,127 B2 | 10/2012 | Marcu et al. |
| 8,315,850 B2 | 11/2012 | Furuuchi et al. |
| 8,326,598 B1 | 12/2012 | Macherey et al. |
| 8,380,486 B2 | 2/2013 | Soricut et al. |
| 8,433,556 B2 | 4/2013 | Fraser et al. |
| 8,442,813 B1 | 5/2013 | Popat |
| 8,468,149 B1 | 6/2013 | Lung et al. |
| 8,504,351 B2 | 8/2013 | Weibel et al. |
| 8,543,563 B1 | 9/2013 | Nikoulina et al. |
| 8,548,794 B2 | 10/2013 | Koehn |
| 8,600,728 B2 | 12/2013 | Knight et al. |
| 8,615,389 B1 | 12/2013 | Marcu |
| 8,655,642 B2 | 2/2014 | Fux et al. |
| 8,666,725 B2 | 3/2014 | Och |
| 8,676,563 B2 | 3/2014 | Soricut et al. |
| 8,694,303 B2 | 4/2014 | Hopkins et al. |
| 8,762,128 B1 | 6/2014 | Brants et al. |
| 8,825,466 B1 | 9/2014 | Wang et al. |
| 8,831,928 B2 | 9/2014 | Marcu et al. |
| 8,886,515 B2 | 11/2014 | Van Assche |
| 8,886,517 B2 | 11/2014 | Soricut et al. |
| 8,886,518 B1 | 11/2014 | Wang et al. |
| 8,942,973 B2 | 1/2015 | Viswanathan |
| 8,943,080 B2 | 1/2015 | Marcu et al. |
| 8,977,536 B2 | 3/2015 | Och |
| 8,990,064 B2 | 3/2015 | Marcu et al. |
| 9,122,674 B1 | 9/2015 | Wong et al. |
| 9,152,622 B2 | 10/2015 | Marcu et al. |
| 9,213,694 B2 | 12/2015 | Hieber et al. |
| 10,261,994 B2 | 4/2019 | Marcu et al. |
| 10,319,252 B2 | 6/2019 | Galley et al. |
| 10,402,498 B2 | 9/2019 | Marcu et al. |
| 10,417,646 B2 | 9/2019 | Soricut et al. |
| 2001/0009009 A1 | 7/2001 | Iizuka |
| 2001/0029455 A1 | 10/2001 | Chin et al. |
| 2002/0002451 A1 | 1/2002 | Sukehiro |
| 2002/0013693 A1 | 1/2002 | Fuji |
| 2002/0040292 A1 | 4/2002 | Marcu |
| 2002/0046018 A1 | 4/2002 | Marcu et al. |
| 2002/0046262 A1 | 4/2002 | Heilig et al. |
| 2002/0059566 A1 | 5/2002 | Delcambre et al. |
| 2002/0078091 A1 | 6/2002 | Vu et al. |
| 2002/0083029 A1 | 6/2002 | Chun et al. |
| 2002/0086268 A1 | 7/2002 | Shpiro |
| 2002/0087313 A1 | 7/2002 | Lee et al. |
| 2002/0099744 A1 | 7/2002 | Coden et al. |
| 2002/0107683 A1 | 8/2002 | Eisele |
| 2002/0111788 A1 | 8/2002 | Kimpara |
| 2002/0111789 A1 | 8/2002 | Hull |
| 2002/0111967 A1 | 8/2002 | Nagase |
| 2002/0115044 A1 | 8/2002 | Shpiro |
| 2002/0143537 A1 | 10/2002 | Ozawa et al. |
| 2002/0152063 A1 | 10/2002 | Tokieda et al. |
| 2002/0169592 A1 | 11/2002 | Aityan |
| 2002/0188438 A1 | 12/2002 | Knight et al. |
| 2002/0188439 A1 | 12/2002 | Marcu |
| 2002/0198699 A1 | 12/2002 | Greene et al. |
| 2002/0198701 A1 | 12/2002 | Moore |
| 2002/0198713 A1 | 12/2002 | Franz et al. |
| 2003/0004705 A1 | 1/2003 | Kempe |
| 2003/0009322 A1 | 1/2003 | Marcu |

(56) References Cited

U.S. PATENT DOCUMENTS

| | | |
|---|---|---|
| 2003/0014747 A1 | 1/2003 | Spehr |
| 2003/0023423 A1 | 1/2003 | Yamada et al. |
| 2003/0040900 A1 | 2/2003 | D'Agostini |
| 2003/0061022 A1 | 3/2003 | Reinders |
| 2003/0077559 A1 | 4/2003 | Braunberger et al. |
| 2003/0129571 A1 | 7/2003 | Kim |
| 2003/0144832 A1 | 7/2003 | Harris |
| 2003/0154071 A1 | 8/2003 | Shreve |
| 2003/0158723 A1 | 8/2003 | Masuichi et al. |
| 2003/0176995 A1 | 9/2003 | Sukehiro |
| 2003/0182102 A1 | 9/2003 | Corston-Oliver et al. |
| 2003/0191626 A1 | 10/2003 | Al-Onaizan et al. |
| 2003/0192046 A1 | 10/2003 | Spehr |
| 2003/0204400 A1 | 10/2003 | Marcu et al. |
| 2003/0216905 A1 | 11/2003 | Chelba et al. |
| 2003/0217052 A1 | 11/2003 | Rubenczyk et al. |
| 2003/0233222 A1 | 12/2003 | Soricut et al. |
| 2004/0006560 A1 | 1/2004 | Chan et al. |
| 2004/0015342 A1 | 1/2004 | Garst |
| 2004/0023193 A1 | 2/2004 | Wen et al. |
| 2004/0024581 A1 | 2/2004 | Koehn et al. |
| 2004/0030551 A1 | 2/2004 | Marcu et al. |
| 2004/0035055 A1 | 2/2004 | Zhu et al. |
| 2004/0044530 A1 | 3/2004 | Moore |
| 2004/0059708 A1 | 3/2004 | Dean et al. |
| 2004/0059730 A1 | 3/2004 | Zhou |
| 2004/0068411 A1 | 4/2004 | Scanlan |
| 2004/0093327 A1 | 5/2004 | Anderson et al. |
| 2004/0098247 A1 | 5/2004 | Moore |
| 2004/0102956 A1 | 5/2004 | Levin |
| 2004/0102957 A1 | 5/2004 | Levin |
| 2004/0111253 A1 | 6/2004 | Luo et al. |
| 2004/0115597 A1 | 6/2004 | Butt |
| 2004/0122656 A1 | 6/2004 | Abir |
| 2004/0167768 A1 | 8/2004 | Travieso et al. |
| 2004/0167784 A1 | 8/2004 | Travieso et al. |
| 2004/0176945 A1 | 9/2004 | Inagaki et al. |
| 2004/0193401 A1 | 9/2004 | Ringger et al. |
| 2004/0230418 A1 | 11/2004 | Kitamura |
| 2004/0237044 A1 | 11/2004 | Travieso et al. |
| 2004/0260532 A1 | 12/2004 | Richardson et al. |
| 2005/0021322 A1 | 1/2005 | Richardson et al. |
| 2005/0021323 A1 | 1/2005 | Li |
| 2005/0021517 A1 | 1/2005 | Marchisio |
| 2005/0026131 A1 | 2/2005 | Elzinga et al. |
| 2005/0033565 A1 | 2/2005 | Koehn |
| 2005/0038643 A1 | 2/2005 | Koehn |
| 2005/0054444 A1 | 3/2005 | Okada |
| 2005/0055199 A1 | 3/2005 | Ryzchachkin et al. |
| 2005/0055217 A1 | 3/2005 | Sumita et al. |
| 2005/0060160 A1 | 3/2005 | Roh et al. |
| 2005/0075858 A1 | 4/2005 | Pournasseh et al. |
| 2005/0086226 A1 | 4/2005 | Krachman |
| 2005/0102130 A1 | 5/2005 | Quirk et al. |
| 2005/0107999 A1 | 5/2005 | Kempe et al. |
| 2005/0125218 A1 | 6/2005 | Rajput et al. |
| 2005/0149315 A1 | 7/2005 | Flanagan et al. |
| 2005/0171757 A1 | 8/2005 | Appleby |
| 2005/0204002 A1 | 9/2005 | Friend |
| 2005/0228640 A1 | 10/2005 | Aue et al. |
| 2005/0228642 A1 | 10/2005 | Mau et al. |
| 2005/0228643 A1 | 10/2005 | Munteanu et al. |
| 2005/0234701 A1 | 10/2005 | Graehl et al. |
| 2005/0267738 A1 | 12/2005 | Wilkinson et al. |
| 2006/0004563 A1 | 1/2006 | Campbell et al. |
| 2006/0015320 A1 | 1/2006 | Och |
| 2006/0015323 A1 | 1/2006 | Udupa et al. |
| 2006/0018541 A1 | 1/2006 | Chelba et al. |
| 2006/0020448 A1 | 1/2006 | Chelba et al. |
| 2006/0041428 A1 | 2/2006 | Fritsch et al. |
| 2006/0095248 A1 | 5/2006 | Menezes et al. |
| 2006/0111891 A1 | 5/2006 | Menezes et al. |
| 2006/0111892 A1 | 5/2006 | Menezes et al. |
| 2006/0111896 A1 | 5/2006 | Menezes et al. |
| 2006/0129424 A1 | 6/2006 | Chan |
| 2006/0136193 A1 | 6/2006 | Lux-Pogodalla et al. |
| 2006/0136824 A1 | 6/2006 | Lin |
| 2006/0142995 A1 | 6/2006 | Knight et al. |
| 2006/0150069 A1 | 7/2006 | Chang |
| 2006/0165040 A1 | 7/2006 | Rathod et al. |
| 2006/0167984 A1* | 7/2006 | Fellenstein et al. .......... 709/203 |
| 2006/0190241 A1 | 8/2006 | Goutte et al. |
| 2007/0010989 A1 | 1/2007 | Faruquie et al. |
| 2007/0015121 A1 | 1/2007 | Johnson et al. |
| 2007/0016400 A1 | 1/2007 | Soricutt et al. |
| 2007/0016401 A1 | 1/2007 | Ehsani et al. |
| 2007/0016918 A1 | 1/2007 | Alcorn et al. |
| 2007/0020604 A1 | 1/2007 | Chulet |
| 2007/0033001 A1 | 2/2007 | Muslea et al. |
| 2007/0043553 A1 | 2/2007 | Dolan |
| 2007/0050182 A1* | 3/2007 | Sneddon ................ G06F 40/47 704/2 |
| 2007/0060114 A1 | 3/2007 | Ramer et al. |
| 2007/0073532 A1 | 3/2007 | Brockett et al. |
| 2007/0078654 A1 | 4/2007 | Moore |
| 2007/0078845 A1 | 4/2007 | Scott et al. |
| 2007/0083357 A1 | 4/2007 | Moore et al. |
| 2007/0094169 A1 | 4/2007 | Yamada et al. |
| 2007/0112553 A1 | 5/2007 | Jacobson |
| 2007/0112555 A1 | 5/2007 | Lavi et al. |
| 2007/0112556 A1 | 5/2007 | Lavi et al. |
| 2007/0122792 A1 | 5/2007 | Galley et al. |
| 2007/0168202 A1* | 7/2007 | Changela et al. ................ 705/1 |
| 2007/0168450 A1 | 7/2007 | Prajapat et al. |
| 2007/0180373 A1 | 8/2007 | Bauman et al. |
| 2007/0208719 A1 | 9/2007 | Tran |
| 2007/0219774 A1 | 9/2007 | Quirk et al. |
| 2007/0233460 A1 | 10/2007 | Lancaster et al. |
| 2007/0233547 A1 | 10/2007 | Younger et al. |
| 2007/0250306 A1 | 10/2007 | Marcu et al. |
| 2007/0265825 A1 | 11/2007 | Cancedda et al. |
| 2007/0265826 A1 | 11/2007 | Chen et al. |
| 2007/0269775 A1 | 11/2007 | Andreev et al. |
| 2007/0294076 A1 | 12/2007 | Shore et al. |
| 2008/0040095 A1 | 2/2008 | Sinha et al. |
| 2008/0046229 A1 | 2/2008 | Maskey et al. |
| 2008/0052061 A1 | 2/2008 | Kim et al. |
| 2008/0065478 A1 | 3/2008 | Kohlmeier et al. |
| 2008/0065974 A1 | 3/2008 | Campbell |
| 2008/0109209 A1 | 5/2008 | Fraser et al. |
| 2008/0114583 A1 | 5/2008 | Al-Onaizan et al. |
| 2008/0154581 A1 | 6/2008 | Lavi et al. |
| 2008/0183555 A1 | 7/2008 | Walk |
| 2008/0195461 A1 | 8/2008 | Li et al. |
| 2008/0215418 A1 | 9/2008 | Kolve et al. |
| 2008/0243450 A1 | 10/2008 | Feblowitz et al. |
| 2008/0249760 A1 | 10/2008 | Marcu et al. |
| 2008/0270109 A1 | 10/2008 | Och |
| 2008/0270112 A1 | 10/2008 | Shimohata |
| 2008/0281578 A1 | 11/2008 | Kumaran et al. |
| 2008/0300857 A1 | 12/2008 | Barbaiani et al. |
| 2008/0307481 A1 | 12/2008 | Panje |
| 2009/0076792 A1 | 3/2009 | Lawson-Tancred |
| 2009/0083023 A1 | 3/2009 | Foster et al. |
| 2009/0106017 A1 | 4/2009 | D'Agostini |
| 2009/0119091 A1 | 5/2009 | Sarig |
| 2009/0125497 A1 | 5/2009 | Jiang et al. |
| 2009/0198487 A1 | 8/2009 | Wong et al. |
| 2009/0234634 A1 | 9/2009 | Chen et al. |
| 2009/0234635 A1 | 9/2009 | Bhatt et al. |
| 2009/0241115 A1* | 9/2009 | Raffo et al. .................... 718/100 |
| 2009/0248662 A1 | 10/2009 | Murdock |
| 2009/0313006 A1 | 12/2009 | Tang |
| 2009/0326912 A1 | 12/2009 | Ueffing |
| 2009/0326913 A1 | 12/2009 | Simard et al. |
| 2010/0005086 A1 | 1/2010 | Wang et al. |
| 2010/0017293 A1 | 1/2010 | Lung et al. |
| 2010/0042398 A1 | 2/2010 | Marcu et al. |
| 2010/0082326 A1 | 4/2010 | Bangalore et al. |
| 2010/0138210 A1 | 6/2010 | Seo et al. |
| 2010/0138213 A1 | 6/2010 | Bicici et al. |
| 2010/0158238 A1* | 6/2010 | Saushkin ................ G06F 3/167 379/265.12 |
| 2010/0174524 A1 | 7/2010 | Koehn |

(56) References Cited

U.S. PATENT DOCUMENTS

| | | |
|---|---|---|
| 2010/0204978 A1 | 8/2010 | Gao et al. |
| 2011/0029300 A1 | 2/2011 | Marcu et al. |
| 2011/0066469 A1* | 3/2011 | Kadosh .................. G06Q 10/06 705/7.13 |
| 2011/0066643 A1 | 3/2011 | Cooper et al. |
| 2011/0082683 A1 | 4/2011 | Soricut et al. |
| 2011/0082684 A1 | 4/2011 | Soricut et al. |
| 2011/0184722 A1 | 7/2011 | Sneddon et al. |
| 2011/0191096 A1 | 8/2011 | Sarikaya et al. |
| 2011/0191410 A1 | 8/2011 | Refuah et al. |
| 2011/0202330 A1 | 8/2011 | Dai et al. |
| 2011/0225104 A1 | 9/2011 | Soricut et al. |
| 2011/0289405 A1* | 11/2011 | Fritsch ................ G06Q 10/0633 715/255 |
| 2011/0307241 A1 | 12/2011 | Waibel et al. |
| 2012/0016657 A1 | 1/2012 | He et al. |
| 2012/0096019 A1 | 4/2012 | Manickam et al. |
| 2012/0116751 A1 | 5/2012 | Bernardini et al. |
| 2012/0136646 A1 | 5/2012 | Kraenzel et al. |
| 2012/0150441 A1 | 6/2012 | Ma et al. |
| 2012/0150529 A1 | 6/2012 | Kim et al. |
| 2012/0185478 A1 | 7/2012 | Topham et al. |
| 2012/0191457 A1 | 7/2012 | Minnis et al. |
| 2012/0203776 A1 | 8/2012 | Nissan |
| 2012/0232885 A1 | 9/2012 | Barbosa et al. |
| 2012/0253783 A1 | 10/2012 | Castelli et al. |
| 2012/0278302 A1 | 11/2012 | Choudhury et al. |
| 2012/0278356 A1 | 11/2012 | Furuta et al. |
| 2012/0323554 A1 | 12/2012 | Hopkins et al. |
| 2013/0018650 A1 | 1/2013 | Moore et al. |
| 2013/0024184 A1 | 1/2013 | Vogel et al. |
| 2013/0103381 A1 | 4/2013 | Assche |
| 2013/0124185 A1 | 5/2013 | Sarr et al. |
| 2013/0144594 A1 | 6/2013 | Bangalore et al. |
| 2013/0226563 A1 | 8/2013 | Hirate |
| 2013/0226945 A1 | 8/2013 | Swinson et al. |
| 2013/0238310 A1 | 9/2013 | Viswanathan |
| 2013/0290339 A1 | 10/2013 | Luvogt et al. |
| 2014/0006003 A1 | 1/2014 | Soricut et al. |
| 2014/0019114 A1 | 1/2014 | Travieso et al. |
| 2014/0149102 A1 | 5/2014 | Marcu et al. |
| 2014/0188453 A1 | 7/2014 | Marcu et al. |
| 2014/0350931 A1 | 11/2014 | Levit et al. |
| 2015/0106076 A1 | 4/2015 | Hieber et al. |
| 2019/0042566 A1 | 2/2019 | Marcu et al. |
| 2019/0303952 A1 | 10/2019 | Soricut et al. |

FOREIGN PATENT DOCUMENTS

| | | |
|---|---|---|
| CA | 2480398 | 6/2011 |
| DE | 1488338 | 4/2010 |
| DE | 202005022113.9 | 2/2014 |
| EP | 0469884 | 2/1992 |
| EP | 0715265 | 6/1996 |
| EP | 0933712 A2 | 8/1999 |
| EP | 0933712 A3 | 1/2001 |
| EP | 1488338 | 9/2004 |
| EP | 1947574 A1 * | 7/2008 ............. G06F 40/58 |
| EP | 1488338 | 4/2010 |
| ES | 1488338 | 4/2010 |
| FR | 1488338 | 4/2010 |
| GB | 1488338 | 4/2010 |
| HK | 1072987 | 2/2006 |
| HK | 1072987 | 9/2010 |
| JP | 07244666 | 9/1995 |
| JP | H08101837 A | 4/1996 |
| JP | 10011447 | 1/1998 |
| JP | 11272672 | 10/1999 |
| JP | 2004501429 | 1/2004 |
| JP | 2004062726 | 2/2004 |
| JP | 2008101837 | 5/2008 |
| JP | 5452868 | 1/2014 |
| WO | WO2003083709 | 10/2003 |
| WO | WO2003083710 | 10/2003 |
| WO | WO2004042615 | 5/2004 |
| WO | WO2007056563 | 5/2007 |
| WO | WO2011041675 | 4/2011 |
| WO | WO2011162947 | 12/2011 |

OTHER PUBLICATIONS

Celine, Volume discounts on large translation project, naked translations, http://www.nakedtranslations.com/en/2007/volume-discounts-on-large-translation-projects/, Aug. 1, 2007, retrieved Jul. 16, 2012.*

Rates of Proofreading versus translating, http://web.archive.org/web/20100222122629/http://www.proz.com/forum/business_issues/202-rates_for_proofreading_versus_translating.html, Feb. 22, 2010, retrieved Mar. 27, 2013.*

Editorial Free Lancer Association, Guidelines for Fees, https://web.archive.org/web/20090604130631/http://www.the-efa.org/res/code_2.php, Jun. 4, 2009, retrieved Aug. 9, 2014.*

Lynn Wasnak, "Beyond the Basics How Much should I Charge", https://web.archive.org/web/20070121231531/http://www.writersmarket.com/assets/pdf/How_Much_Should_I_Charge.pdf, Jan. 21, 2007, retrieved Aug. 19, 2014.*

Sharon O'Brien, "Towards predicting post-editing productivity", Sep. 27, 2011, pp. 197-215 (Year: 2011).*

Correlation between Automatic Evaluation Metric Scores, Post-Editing Speed, and Some Other Factors, Jan. 2009, 9 pgs. (Year: 2009).*

"Koehn, P. and Knight, K., ""Knowledge Sources for Word-Level Translation Models,"" 2001, Conference on EmpiricalMethods in Natural Language Processing. (NPL0111)".

"Kumar, R. and Li, H., ""Integer Programming Approach to Printed Circuit Board Assembly Time Optimization,"" 1995,IEEE Transactions on Components, Packaging, and Manufacturing, Part B: Advance Packaging, vol. 18,No. 4. pp. 720-727. (NPL0112)".

Kupiec, Julian, "An Algorithm for Finding Noun Phrase Correspondences in Bilingual Corpora," In Proceedings of the 31st Annual Meeting of the ACL, 1993, pp. 17-22. (NPL0113).

"Kurohashi, S. and Nagao, M., ""Automatic Detection of Discourse Structure by Checking Surface Information inSentences,"" 1994, Proc. of Col-Ling '94, vol. 2, pp. 1123-1127. (NPL0114)".

"Langkilde, I. and Knight, K., ""Generation that Exploits Corpus-Based Statistical Knowledge,"" 1998, Proc. of theCOLING-ACL, pp. 704-710. (NPL0115)".

"Langkilde, I. and Knight, K., ""The Practical Value of N-Grams in Generation,"" 1998, Proc. of the 9th InternationalNatural Language Generation Workshop, pp. 248-255. (NPL0116)".

"Langkilde, Irene, ""Forest-Based Statistical Sentence Generation,"" 2000, Proc. of the 1st Conference on NorthAmerican chapter of the ACL, Seattle, WA, pp. 170-177. (NPL0117)".

"Langkilde-Geary, Irene, ""A Foundation for General-Purpose Natural Language Generation: SentenceRealization Using Probabilistic Models of Language,"" 2002, Ph.D. Thesis, Faculty of the Graduate School, Universityof Southern California. (NPL0118)".

"Langkilde-Geary, Irene, ""An Empirical Verification of Coverage and Correctness for a General-PurposeSentence Generator,"" 1998, Proc. 2nd Int'l Natural Language Generation Conference. (NPL0119)".

"Lee-Y.S.,""Neural Network Approach to Adaptive Learning: with an Application to Chinese HomophoneDisambiguation,"" IEEE pp. 1521-1526. (NPL0120)".

Lita, L., et al., "tRuEcasIng," Proceedings of the 41st Annual Meeting of the Assoc. for Computational Linguistics (In Hinrichs, E. and Roth, D.—editors), pp. 152-159. (NPL0121).

Llitjos, A. F. et al., "The Translation Correction Tool: English-Spanish User Studies," Citeseer © 2004, downloaded from: http://gs37.sp.cs.cmu.edu/ari/papers/Irec04/fontll, pp. 1-4. (NPL0122).

"Mann, G. and Yarowsky, D., ""Multipath Translation Lexicon Induction via Bridge Languages,"" 2001, Proc. of the2nd Conference of the North American Chapter of the ACL, Pittsburgh, PA, pp. 151-158. (NPL0123)".

"Manning, C. and Schutze, H., ""Foundations of Statistical Natural Language Processing,""2000, The MIT Press, Cambridge, MA [redacted]. (NPL0125)".

(56) References Cited

OTHER PUBLICATIONS

"Marcu, D. and Wong, W., ""A Phrase-Based, Joint Probability Model for Statistical Machine Translation,"" 2002, Proc.of ACL-2 conference on Empirical Methods in Natural Language Processing, vol. 10, pp. 133-139. (NPL0126)".
"Marcu, Daniel, ""Building Up Rhetorical Structure Trees,"" 1996, Proc. of the National Conference on ArtificialIntelligence and Innovative Applications of Artificial Intelligence Conference, vol. 2, pp. 1069-1074. (NPL0127)".
"Marcu, Daniel, ""Discourse trees are good indicators of importance in text,"" 1999, Advances in Automatic TextSummarization, The MIT Press, Cambridge, MA. (NPL0128)".
"Marcu, Daniel, ""Instructions for Manually Annotating the Discourse Structures of Texts,"" 1999, DiscourseAnnotation, pp. 1-49. (NPL0129)".
"Marcu, Daniel, ""The Rhetorical Parsing of Natural Language Texts,"" 1997, Proceedings of ACLIEACL '97, pp. 96-103. (NPL0130)".
"Marcu, Daniel, ""The Rhetorical Parsing, Summarization, and Generation of Natural Language Texts,"" 1997, Ph.D.Thesis, Graduate Department of Computer Science, University of Toronto. (NPL0131)".
"Marcu, Daniel, ""Towards a Unified Approach to Memory- and Statistical-Based Machine Translation,"" 2001, Proc.of the 39th Annual Meeting of the ACL, pp. 378-385. (NPL0132)".
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191. (NPL0133).
McDevitt, K. et al., "Designing of a Community-based Translation Center," Technical Report TR-03-30, Computer Science, Virginia Tech, © 2003, pp. 1-8. (NPL0134).
"Melamed, I. Dan, ""A Word-to-Word Model of Translational Equivalence,"" 1997, Proc. of the 35th Annual Meeting ofthe ACL, Madrid, Spain, pp. 490-497. (NPL0135)".
"Melamed, I. Dan, ""Automatic Evaluation and Uniform Filter Cascades for Inducing N-Best Translation Lexicons,"" 1995, Proc. of the 3rd Workshop on Very Large Corpora, Boston, MA, pp. 184-198. (NPL0136)".
"Melamed, I. Dan, ""Empirical Methods for Exploiting Parallel Texts,"" 2001, MIT Press, Cambridge, MA [table ofcontents]. (NPL0137)".
"Meng et al.. ""Generating Phonetic Cognates to Handle Named Entities in English-Chinese Cross-LanguageSpoken Document Retrieval,"" 2001, IEEE Workshop on Automatic Speech Recognition and Understanding. pp. 311-314. (NPL0138)".
Metze, F. et al., "The NESPOLE! Speech-to-Speech Translation System," Proc. Of the HLT 2002, 2nd Int'l Conf. on Human Language Technology (San Francisco, CA), © 2002, pp. 378-383. (NPL0139).
"Mikheev et al., ""Named Entity Recognition without Gazeteers,"" 1999, Proc. of European Chapter of the ACL, Bergen,Norway, pp. 1-8. (NPL0140)".
"Miike et al., ""A Full-Text Retrieval System with a Dynamic Abstract Generation Function,"" 1994, Proceedings of SI-GIR'94, pp. 152-161. (NPL0141)".
"Mohri, M. and Riley, M., ""An Efficient Algorithm for the N-Best-Strings Problem,"" 2002, Proc. of the 7th Int. Conf. onSpoken Language Processing (ICSLP'02), Denver, CO, pp. 1313-1316. (NPL0142)".
Mohri, Mehryar, "Regular Approximation of Context Free Grammars Through Transformation", 2000, pp. 251-261, "Robustness in Language and Speech Technology", Chapter 9, Kluwer Academic Publishers. (NPL0143).
"Monasson et al., ""Determining Computational Complexity from Characteristic 'Phase Transitions',"" Jul. 1999, NatureMagazine, vol. 400, pp. 133-137. (NPL0144)".
"Mooney, Raymond, ""Comparative Experiments on Disambiguating Word Senses: An Illustration of the Role of Biasin Machine Learning,"" 1996, Proc. of the Conference on Empirical Methods in Natural Language Processing, pp. 82-91. (NPL0145)".
Nagao, K. et al., "Semantic Annotation and Transcoding: Making Web Content More Accessible," IEEE Multimedia, vol. 8, Issue 2 Apr.-Jun. 2001, pp. 69-81. (NPL0146).
"Nederhof, M. and Satta, G., ""IDL-Expressions: A Formalism for Representing and Parsing Finite Languages inNatural Language Processing,"" 2004, Journal of Artificial Intelligence Research, vol. 21, pp. 281-287. (NPL0147)".
"Nieben, S. and Ney, H, ""Toward Hierarchical Models for Statistical Machine Translation of Inflected Languages,"" 2001,Data-Driven Machine Translation Workshop, Toulouse, France, pp. 47-54. (NPL0148)".
Norvig, Peter, "Techniques for Automatic Memoization with Applications to Context-Free Parsing", Compuational Linguistics,1991, pp. 91-98, vol. 17, No. 1 (NPL0149).
"Och et al., ""Improved Alignment Models for Statistical Machine Translation,"" 1999, Proc. of the Joint Conf. ofEmpirical Methods in Natural Language Processing and Very Large Corpora, pp. 20-28. (NPL0150)".
Och et al. "A Smorgasbord of Features for Statistical Machine Translation." HLTNAACL Conference. Mar. 2004, 8 pages. (NPL0151).
Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096. (NPL0152).
"Och, F. and Ney, H, ""Improved Statistical Alignment Models,"" 2000, 38th Annual Meeting of the ACL, Hong Kong, pp. 440-447. (NPL0153)".
Och, F. and Ney, H., "Discriminative Training and Maximum Entropy Models for Statistical Machine Translation," 2002, Proc. of the 40th Annual Meeting of the ACL, Philadelphia, PA, pp. 295-302. (NPL0154).
Och, F. and Ney, H., "A Systematic Comparison of Various Statistical Alignment Models," Computational Linguistics, 2003, 29:1, 19-51. (NPL0155).
"Papineni et al., ""Bleu: a Method for Automatic Evaluation of Machine Translation,"" 2001, IBM Research Report, RC22176(WQ102-022). (NPL0156)".
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324. (NPL0158).
Petrov et al., "Learning Accurate, Compact and Interpretable Tree Annotation," Jun. 4-9, 2006, in Proc. of the Human Language Technology Conference of the North American Chapter of the ACL, pp. 433-440. (NPL0159).
"Pla et al., ""Tagging and Chunking with Bigrams,"" 2000, Proc. of the 18th Conference on Computational Linguistics, vol. 2, pp. 614-620. (NPL0160)".
Qun, Liu, "A Chinese-English Machine Translation System Based on Micro-Engine Architecture," An Int'l. Conference on Translation and Information Technology, Hong Kong, Dec. 2000, pp. 1-10. (NPL0161).
Rapp, Reinhard, Automatic Identification of Word Translations from Unrelated English and German Corpora, 1999, 37th Annual Meeting of the ACL, pp. 519-526. (NPL0163).
Office Action dated May 9, 2012 in U.S. Appl. No. 11/640,157, filed Dec. 15, 2006.
Office Action dated Jun. 7, 2012 in U.S. Appl. No. 11/698,501, filed Jan. 26, 2007.
Non-Final Office Actions dated Apr. 17, 2008, Mar. 3, 2009, Nov. 27, 2009, and date Mar. 1, 2011, Final Office Actions dated Oct. 27, 2008, Sep. 24, 2009, Jul. 19, 2010, and Aug. 15, 2011, and Advisory Actions dated Sep. 30, 2010 and Nov. 29, 2011 in U.S. Appl. No. 11/454,212, filed Jun. 15, 2006.
Non-Final Office Action dated Mar. 10, 2008, Final Office Actions dated Oct. 7, 2008, Jan. 27, 2010, an Advisory Action dated Jan. 22, 2009, and Exam Answers dated Jul. 23, 2009 in U.S. Appl. No. 11/272,460, filed Nov. 9, 2005.
Non-Final Office Actions dated Sep. 29, 2005, Feb. 14, 2006, Jul. 19, 2007, Aug. 4, 2008, Feb. 26, 2009, and Aug. 5, 2010, Final

(56) References Cited

OTHER PUBLICATIONS

Office Actions dated Jun. 8, 2006, Dec. 7, 2007, Aug. 18, 2009, and Jan. 20, 2011, Advisory Actions dated Aug. 25, 2006 and Apr. 15, 2008, and Notices of Allowance dated Feb. 6, 2012 and Oct. 25, 2011 in U.S. Appl. No. 10/190,298, filed Jul. 3, 2002.
Non-Final Office Actions dated Sep. 5, 2007, Mar. 24, 2008, Oct. 6, 2008, Apr. 7, 2009, Sep. 18, 2009, Feb. 4, 2011, Final Office Actions dated Feb. 18, 2010 and Aug. 29, 2011, and Advisory Actions dated May 3, 2010 and Nov. 15, 2011 in U.S. Appl. No. 10/884,175, filed Jul. 2, 2004.
Non-Final Office Action dated May 24, 2007, a Final Office Action dated Nov. 14, 2007, an Advisory Action dated Feb. 22, 2008, Exam Answers dated Nov. 28, 2008, and Notice of Allowance dated Jul. 13, 2011 in U.S. Appl. No. 11/087,376, filed Mar. 22, 2005.
Non-Final Office Actions dated Dec. 21, 2007, Jun. 9, 2008, May 13, 2009, Aug. 30, 2011, Final Office Actions dated Dec. 4, 2008 and Nov. 19, 2009, and an Advisory Action dated Feb. 12, 2009 in U.S. Appl. No. 11/107,304, filed Apr. 15, 2005.
Non-Final Office Actions dated Oct. 28, 2008, May 13, 2009, May 13, 2010, and Dec. 2, 2011 and Final Office Actions dated Dec. 11, 2009 and Oct. 14, 2010 in U.S. Appl. No. 11/250,151, filed Oct. 12, 2005.
Non-Final Office Actions dated Apr. 1, 2010, Sep. 28, 2010, Feb. 14, 2012 and a Final Office Action dated Feb. 28, 2011 in U.S. Appl. No. 11/592,450, filed Nov. 2, 2006.
Non-Final Office Action dated Apr. 13, 2010, a Final Office Action dated Sep. 2, 2010, and an Advisory Action dated Nov. 16, 2010 in U.S. Appl. No. 11/501,189, filed Aug. 7, 2006.
Non-Final Office Action dated Jan. 21, 2010, Final Office Actions dated Sep. 1, 2010, Apr. 26, 2011 and Aug. 31, 2011, and an Advisory Action dated Nov. 17, 2011 in U.S. Appl. No. 11/640,157, filed Dec. 15, 2006.
Non-Final Office Actions dated Dec. 24, 2008 and Dec. 22, 2009, and Final Office Actions dated Aug. 4, 2009 and Jul. 6, 2010 in U.S. Appl. No. 11/698,501, filed Jan. 26, 2007.
Non-Final Office Actions dated Apr. 26, 2010, and Oct. 4, 2011 and a Final Office Action dated Oct. 13, 2010 in U.S. Appl. No. 11/784,161, filed Apr. 4, 2007.
Non-Final Office Action dated Jun. 17, 2011 and Final Office Action dated Dec. 14, 2011 in U.S. Appl. No. 12/077,005, filed Mar. 14, 2008.
Non-Final Office Action dated Jul. 7, 2010 and Final Office Action dated Feb. 1, 2011 in U.S. Appl. No. 11/811,228, filed Jun. 8, 2007.
Non-Final Office Action dated Aug. 23, 2011 in U.S. Appl. No. 12/132,401, filed Jun. 3, 2008.
Non-Final Office Actions dated Oct. 4, 2010 and Aug. 5, 2011 and a Final Office Action dated Apr. 12, 2011 in U.S. Appl. No. 12/218,859, filed Jul. 17, 2008.
Non-Final Office Action dated Jul. 7, 2011 and a Notice of Allowance dated Mar. 13, 2012 in U.S. Appl. No. 12/576,110, filed Oct. 8, 2009.
Non-Final Office Action dated Jun. 9, 2011 in U.S. Appl. No. 12/722,470, filed Mar. 11, 2010.
Non-Final Office Actions dated Sep. 28, 2010 and Mar. 16, 2011, a Final Office Action dated Aug. 9, 2011, and an Advisory Action dated Nov. 1, 2011 in U.S. Appl. No. 11/635,248, filed Dec. 5, 2006.
Non-Final Office Action dated Oct. 11, 2005 and a Notice of Allowance dated Apr. 28, 2006 in U.S. Appl. No. 10/160,284, filed May 31, 2002.
Non-Final Office Action dated Oct. 10, 2006 and a Notice of Allowance dated Oct. 10, 2007 in U.S. Appl. No. 10/401,134, filed Mar. 26, 2003.
Non-Final Office Actions dated Oct. 11, 2006, Oct. 12, 2007, May 13, 2008, Dec. 12, 2008, and Final Office Actions dated Apr. 3, 2007 and Jun. 16, 2009, an Advisory Action dated Jul. 18, 2007, and a Notice of Allowance dated Jul. 10, 2009 in U.S. Appl. No. 10/401,124, filed Mar. 26, 2003.
Non-Final Office Action dated Nov. 7, 2006 and a Notice of Allowance dated Mar. 30, 2007 in U.S. Appl. No. 10/387,032, filed Mar. 11, 2003.

Non-Final Office Actions dated Oct. 31, 2007 and Nov. 13, 2008, Final Office Actions dated May 9, 2007 and May 7, 2008, Advisory Actions dated Jul. 30, 2007 and Aug. 1, 2008, and a Notice of Allowance dated Jul. 9, 2009 in U.S. Appl. No. 10/403,862, filed Mar. 28, 2003.
Non-Final Office Actions dated Nov. 8, 2006 and Nov. 16, 2007, a Final Office Action dated May 30, 2007, an Advisory Action dated Aug. 15, 2007, and a Notice of Allowance dated Jul. 30, 2008 in U.S. Appl. No. 10/402,350, filed Mar. 27, 2003.
Non-Final Office Actions dated Sep. 19, 2007, Mar. 27, 2008, Oct. 6, 2008 and Aug. 11, 2009, a Final Office Action dated Apr. 28, 2009, and a Notice of Allowance dated Dec. 31, 2009 in U.S. Appl. No. 10/884,174, filed Jul. 2, 2004.
Non-Final Office Action dated Mar. 31, 2009 and a Final Office Action dated Oct. 9, 2009, and Notices of Allowance dated Dec. 1, 2009 and Jan. 13, 2010 in U.S. Appl. No. 11/082,216, filed Mar. 15, 2005.
Non-Final Office Actions dated Mar. 17, 2009 and Jun. 9, 2010, a Final Office Action dated Sep. 10, 2009 and a Notice of Allowance dated Feb. 18, 2011 in U.S. Appl. No. 11/158,897, filed Jun. 21, 2005.
Non-Final Office Action dated Aug. 7, 2007 and Notices of Allowance dated Feb. 19, 2008 and Feb. 25, 2008 in U.S. Appl. No. 11/412,307, filed Apr. 26, 2006.
Non-Final Office Action dated Oct. 7, 2008 and a Notice of Allowance dated Apr. 22, 2009 in U.S. Appl. No. 11/811,384, filed Jul. 7, 2007.
Non-Final Office Actions dated Sep. 15, 2005, Mar. 17, 2006, Jun. 6, 2007, and Oct. 2, 2008, Final Office Actions dated Sep. 18, 2006 and Dec. 14, 2007, an Advisory Action dated Jan. 10, 2007, and a Notice of Allowance dated Mar. 20, 2009 in U.S. Appl. No. 09/854,327, filed May 11, 2001.
Non-Final Office Actions dated Jun. 18, 2008, Feb. 10, 2009, and Dec. 15, 2009, a Final Office Action dated Aug. 25, 2009, and a Notice of Allowance dated Jun. 10, 2010 in U.S. Appl. No. 11/197,744, filed Aug. 3, 2005.
Non-Final Office Actions dated Aug. 8, 2006 and Mar. 6, 2007 and a Notice of Allowance dated Jul. 30, 2007 in U.S. Appl. No. 10/143,382, filed May 9, 2002.
Non-Final Office Actions dated Apr. 17, 2006, Oct. 18, 2006, Jan. 9, 2008, Jul. 29, 2008, Final Office Actions dated Jul. 19, 2007 and Jan. 12, 2009, and a Notice of Allowance dated Nov. 16, 2009 in U.S. Appl. No. 10/150,532, filed May 17, 2002.
Non-Final Office Actions dated Sep. 20, 2007, Aug. 6, 2008, and Feb. 3, 2009, a Final Office Action dated Mar. 4, 2008, an Advisory Action dated Jun. 9, 2008, and a Notice of Allowance dated Jul. 9, 2009 in U.S. Appl. No. 11/223,823, filed Sep. 9, 2005.
Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354. (NPL0228).
Frederking et al., "Three Heads are Better Than One," In Proceedings of the 4th Conference on Applied Natural Language Processing, Stuttgart, Germany, 1994, pp. 95-100. (NPL0229).
Och et al., "Discriminative Training and Maximum Entropy Models for Statistical Machine Translation," In Proc. of the 40th Annual Meeting of the Association for Computational Linguistics (ACL), Philadelphia, PA, 2002. (NPL0230).
Yasuda et al., "Automatic Machine Translation Selection Scheme to Output the Best Result," Proc of LREC, 2002, pp. 525-528. (NPL0231).
Final Office Action dated Apr. 9, 2012 in U.S. Appl. No. 11/107,304, filed Apr. 15, 2005.
Final Office Action dated Mar. 27, 2012 in U.S. Appl. No. 12/132,401, filed Jun. 3, 2008.
Final Office Action dated Apr. 24, 2012 in U.S. Appl. No. 12/218,859, filed Jul. 17, 2008.
"Elhadad, Michael, ""FUF: the Universal Unifier User Manual Version 5.2"", 1993, Department of Computer Science,Ben Gurion University, Beer Sheva, Israel. (NPL0054)".
"Elhadad, Michael, ""Using Argumentation to Control Lexical Choice: A Functional Unification Implementation"",1992, Ph.D. Thesis, Graduate School of Arts and Sciences, Columbia University. (NPL0055)".

(56) References Cited

OTHER PUBLICATIONS

"Elhadad, M. and Robin, J., ""Surge: a Comprehensive Plug-in Syntactic Realization Component for TextGeneration"", 1999 (available at http://www.cs.bgu.ac.il/-elhadad/pub.html), (NPL0056)".

Fleming, Michael et al., "Mixed-Initiative Translation of Web Pages," AMTA 2000, LNAI 1934, Springer-Verlag, Berlin, Germany, 2000, pp. 25-29. (NPL0057).

Och, Franz Josef and Ney, Hermann, "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps>' retrieved on May 6, 2004! abstract (NPL0058).

Ren, Fuji and Shi, Hongchi, "Parallel Machine Translation: Principles and Practice," Engineering of Complex Computer Systems, 2001 Proceedings, Seventh IEEE Int'l. Conference, pp. 249-259, 2001. (NPL0059).

Fung et al, "Mining Very-Non-Parallel Corpora: Parallel Sentence and Lexicon Extraction via Bootstrapping and EM", In EMNLP 2004 (NPL0060).

"Fung, P. and Yee, L., ""An IR Approach for Translating New Words from Nonparallel, Comparable Texts"", 1998,36th Annual Meeting of the ACL, 17th International Conference on Computational Linguistics, pp. 414-420. (NPL0061)".

"Fung, Pascale, ""Compiling Bilingual Lexicon Entries From a Non-Parallel English-Chinese Corpus"", 1995, Proc, ofthe Third Workshop on Very Large Corpora, Boston, MA, pp. 173-183. (NPL0062)".

"Gale, W. and Church, K., ""A Program for Aligning Sentences in Bilingual Corpora,"" 1991, 29th Annual Meeting ofthe ACL, pp. 177-183. (NPL0063)".

Gale, W. and Church, K., "A Program for Aligning Sentences in Bilingual Corpora," 1993, Computational Linguisitcs, vol. 19, No. 1, pp. 177-184 (NPL0064).

Galley et al., "Scalable Inference and Training of Context-Rich Syntactic Translation Models," Jul. 2006, in Proc. Of the 21st International Conference on Computational Linguistics, pp. 961-968. (NPL0065).

Galley et al., "What's in a translation rule?", 2004, in Proc. Of HLT/NAACL '04, pp. 1-8. (NPL0066).

Gaussier et al, "A Geometric View on Bilingual Lexicon Extraction from Comparable Corpora", In Proceedings of ACL July 2004 (NPL0067).

"Germann et al., ""Fast Decoding and Optimal Decoding for Machine Translation"", 2001, Proc. of the 39th AnnualMeeting of the ACL, Toulouse, France, pp. 228-235. (NPL0068)".

"Germann, Ulrich: ""Building a Statistical Machine Translation System from Scratch: How Much Bang for theBuck Can We Expect?"" Proc. of the Data-Driven MT Workshop of ACL-01, Toulouse, France, 2001. (NPL0069)".

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107. (NPL0070).

"Grefenstette, Gregory, ""The World Wide Web as a Resource for Example-Based Machine TranslationTasks"", 1999, Translating and the Computer 21, Proc. of the 21 st International Cant. on Translating and theComputer. London, UK, 12 pp. (NPL0071)".

Grossi et al, "Suffix Trees and Their Applications in String Algorithms", In. Proceedings of the 1st South American Workshop on String Processing, Sep. 1993, pp. 57-76 (NPL0072).

Gupta et al., "Kelips: Building an Efficient and Stable P2P DHT thorough Increased Memory and Background Overhead," 2003 IPTPS, LNCS 2735, pp. 160-169. (NPL0073).

Habash, Nizar, "The Use of a Structural N-gram Language Model in Generation-Heavy Hybrid Machine Translation," University of Maryland, Univ. Institute for Advance Computer Studies, Sep. 8, 2004. (NPL0074).

"Hatzivassiloglou, V. et al., ""Unification-Based Glossing"", 1995, Proc. of the International Joint Conference onArtificial Intelligence, pp. 1382-1389. (NPL0075)".

Huang et al., "Relabeling Syntax Trees to Improve Syntax-Based Machine Translation Quality," Jun. 4-9 2006, in Proc. of the Human Language Techology Conference of the North Americna Chapter of the ACL, pp. 240-247. (NPL0076).

Ide, N. and Veronis, J., "Introduction to the Special Issue on Word Sense Disambiguation: The State of the Art", Mar. 1998, Computational Linguistics, vol. 24, Issue 1, pp. 2-40. (NPL0077).

Bikel, D., Schwartz, R., and Weischedei, R., "An Algorithm that Learns What's in a Name," Machine Learning 34, 211-231 (1999). (NPL0078).

Imamura et al., "Feedback Cleaning of Machine Translation Rules Using Automatic Evaluation," 2003 Computational Linguistics, pp. 447-454. (NPL0079).

Imamura, Kenji, "Hierarchical Phrase Alignment Harmonized with Parsing", 2001, in Proc. of NLPRS, Tokyo. (NPL0080).

"Jelinek, F., ""Fast Sequential Decoding Algorithm Using a Stack"", Nov. 1969, IBM J. Res. Develop., vol. 13, No. 6, pp. 675-685. (NPL0082)".

"Jones, K. Sparck, ""Experiments in Relevance Weighting of Search Terms"", 1979, Information Processing &Management, vol. 15, Pergamon Press Ltd., UK, pp. 133-144. (NPL0083)".

Klein et al., "Accurate Unlexicalized Parsing," Jul. 2003, in Proc. of the 41st Annual Meeting of the ACL, pp. 423-430. (NPL0087).

"Knight et al., ""Integrating Knowledge Bases and Statistics in MT,"" 1994, Proc. of the Conference of the Associationfor Machine Translation in the Americas. (NPL0088)".

"Knight et al., ""Filling Knowledge Gaps in a Broad-Coverage Machine Translation System"", 1995, Proc. ofthe14th International Joint Conference on Artificial Intelligence, Montreal, Canada, vol. 2, pp. 1390-1396. (NPL0089)".

"Knight, K. and Al-Onaizan, Y., ""A Primer on Finite-State Software for Natural Language Processing"", 1999 (available at http://www.isLedullicensed-sw/carmel). (NPL0091)".

Knight, K. and Al-Onaizan, Y., "Translation with Finite-State Devices," Proceedings of the 4th AMTA Conference, 1998. (NPL0092).

"Knight, K. and Chander, I., ""Automated Postediting of Documents,"" 1994, Proc. of the 12th Conference on ArtificialIntelligence, pp. 779-784. (NPL0093)".

Knight, K. and Graehl, J., "Machine Transliteration", 1997, Proc. of the ACL-97, Madrid, Spain, pp. 128-135. (NPL0094).

"Knight, K. and Hatzivassiloglou, V., ""Two-Level, Many-Paths Generation,"" 1995, Proc. of the 33rd AnnualConference of the ACL, pp. 252-260. (NPL0095)".

"Knight, K. and Luk, S., ""Building a Large-Scale Knowledge Base for Machine Translation,"" 1994, Proc. of the 12thConference on Artificial Intelligence, pp. 773-778. (NPL0096)".

"Knight, K. and Marcu, D., ""Statistics-Based Summarization—Step One: Sentence Compression,"" 2000, AmericanAssociation for Artificial Intelligence Conference, pp. 703-710. (NPL0097)".

"Knight, K. and Yamada, K., ""A Computational Approach to Deciphering Unknown Scripts,"" 1999, Proc. of the ACLWorkshop on Unsupervised Learning in Natural Language Processing. (NPL0098)".

"Knight, Kevin, ""A Statistical MT Tutorial Workbook,"" 1999, JHU Summer Workshop (available at http://www.isLedu/natural-language/mUwkbk.rtf). (NPL0101)".

Knight, Kevin, "Automating Knowledge Acquisition for Machine Translation," 1997, AI Magazine, vol. 18, No. 4. (NPL0102).

"Knight, Kevin, ""Connectionist Ideas and Algorithms,"" Nov. 1990, Communications of the ACM, vol. 33, No. 11, pp. 59-74. (NPL0103)".

"Knight, Kevin, ""Decoding Complexity in Word-Replacement Translation Models"", 1999, Computational Linguistics, vol. 25, No. 4. (NPL0104)".

"Knight, Kevin, ""Integrating Knowledge Acquisition and Language Acquisition"", May 1992, Journal of AppliedIntelligence, vol. 1, No. 4. (NPL0105)".

"Knight, Kevin, ""Learning Word Meanings by Instruction,"" 1996, Proc. of the D National Conference on ArtificialIntelligence, vol. 1, pp. 447-454. (NPL0106)".

(56) References Cited

OTHER PUBLICATIONS

Knight, Kevin, "Unification: A Multidisciplinary Survey," 1989, ACM Computing Surveys, vol. 21, No. 1. (NPL0107).
Koehn, Philipp, "Noun Phrase Translation," A PhD Dissertation for the University of Southern California, pp. xiii, 23, 25-57, 72-81, Dec. 2003. (NPL0108).
"Koehn, P. and Knight, K., ""ChunkMT: Statistical Machine Translation with Richer Linguistic Knowledge,"" Apr. 2002,Information Sciences Institution. (NPL0109)".
"Koehn, P. and Knight, K., ""Estimating Word Translation Probabilities from Unrelated Monolingual Corpora UsingthE EM Algorithm,"" 2000, Proc. of the 17th meeting of the AAAI. (NPL0110)".
Zhang et al., "Synchronous Binarization for Machine Translations," Jun. 4-9, 2006, in Proc. of the Human Language Technology Conference of the North American Chapter of the ACL, pp. 256-263. (NPL0217).
Zhang et al., "Distributed Language Modeling for N-best List Re-ranking," In Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223. (NPL0218).
"Patent Cooperation Treaty International Preliminary Report on Patentability and The Written Opinion, Internationalapplication No. PCT/US2008/004296, dated Oct. 6, 2009, 5 pgs. (NPL0219)".
Document, Wikipedia.com, web.archive.org (Feb. 24, 2004) <http://web.archive.org/web/20040222202831 /http://en.wikipedia.org/wikiiDocument>, Feb, 24, 2004 (NPL0220).
Identifying, Dictionary.com, wayback.archive.org (Feb. 28, 2007) <http://wayback.archive.org/web/200501 01OOOOOO*/http:////dictionary.reference.com//browse//identifying>, Feb. 28, 2005 <http://web.archive.org/web/20070228150533/http://dictionary.reference.com/browse/identifying> (NPL0221).
Koehn, P. et al, "Statistical Phrase-Based Translation," Proceedings of HLT-NAACL 2003 Main Papers , pp. 48-54 Edmonton, May-Jun. 2003. (NPL0222).
Abney, S.P., "Stochastic Attribute Value Grammars", Association for Computional Linguistics, 1997, pp. 597-618 (NPL0223).
Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.idc.upenn.edu/W/W02/W02-1039.pdf> (NPL0224).
Tillman, C., et al, "Word Reordering and a Dynamic Programming Beam Search Algorithm for Statistical Machine Translation" <URL: http://acl.ldc.upenn.edu/J/J03/J03-1005.pdf> (NPL0225).
Wang, W., et al. "Capitalizing Machine Translation" In HLT-NAACL '06 Proceedings Jun. 2006. <http://www.isi.edu/natural-language/mt/hlt-naac1-06-wang.pdf> (NPL0226).
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf> (NPL0227).
"Rapp, Reinhard, ""Identifying Word Translations in Non-Parallel Texts,"" 1995, 33rd Annual Meeting of the ACL, pp. 320-322. (NPL0164)".
Rayner et al.,"Hybrid Language Processing in the Spoken Language Translator," IEEE, pp. 107-110. (NPL0165).
"Resnik, P. and Smith, A., ""The Web as a Parallel Corpus,"" Sep. 2003, Computational Linguistics, SpecialIssue on Web as Corpus, vol. 29, Issue 3, pp. 349-380. (NPL0166)".
"Resnik, P. and Yarowsky, D. ""A Perspective on Word Sense Disambiguation Methods and Their Evaluation,"" 1997, Proceedings of SIGLEX '97, Washington, D.C., pp. 79-86. (NPL0167)".
"Resnik, Philip, ""Mining the Web for Bilingual Text,"" 1999, 37th Annual Meeting of the ACL, College Park, MD, pp. 527-534. (NPL0168)".
Rich, E. and Knight, K., "Artificial Intelligence, Second Edition," 1991, McGraw-Hili Book Company [redacted]. (NPL0169).

"Richard et al., ""Visiting the Traveling Salesman Problem with Petri nets and application in the glass industry,"" Feb. 1996, IEEE Emerging Technologies and Factory Automation, pp. 238-242. (NPL0170)".
"Robin, Jacques, ""Revision-Based Generation of Natural Language Summaries Providing Historical Background: Corpus-Based Analysis, Design Implementation and Evaluation,"" 1994, Ph.D. Thesis, Columbia University, New York. (NPL0171)".
Rogati et al., "Resource Selection for Domain-Specific Cross-Lingual IR," ACM 2004, pp. 154-161. (NPL0172).
Zhang, R. et al., "The NiCT-ATR Statistical Machine Translation System for the IWSLT 2006 Evaluation," submitted to IWSLT, 2006. (NPL0173).
"Russell, S. and Norvig, P., ""Artificial Intelligence: A Modern Approach,"" 1995, Prentice-Hall, Inc., New Jersey [redacted—table of contents]. (NPL0174)".
"Sang, E. and Buchholz, S., ""Introduction to the CoNLL-2000 Shared Task: Chunking,"" 2002, Proc. ofCoNLL-2000 and LLL-2000, Lisbon, Portugal, pp. 127-132. (NPL0175)".
Schmid, H., and Schulte im Walde, S., "Robust German Noun Chunking With a Probabilistic Context-Free Grammar," 2000, Proc. of the 18th Conference on Computational Linguistics, vol. 2, pp. 726-732. (NPL0176).
"Schutze, Hinrich, ""Automatic Word Sense Discrimination,"" 1998, Computational Linguistics, Special Issue on WordSense Disambiguation, vol. 24, Issue 1, pp. 97-123. (NPL0177)".
"Selman et al., ""A New Method for Solving Hard Satisfiability Problems,"" 1992, Proc. of the 10th National Conferenceon Artificial Intelligence, San Jose, CA, pp. 440-446. (NPL0178)".
Kumar, S. and Byrne, W., "Minimum Bayes-Risk Decoding for Statistical Machine Translation." HLTNAACL Conference. Mar. 2004, 8 pages. (NPL0179).
"Shapiro, Stuart (ed.), ""Encyclopedia of Artificial Intelligence, 2nd edition"", vol. D 2,1992, John Wiley & Sons Inc;""Unification"" article, K. Knight, pp. 1630-1637. (NPL0180)".
Shirai, S., "A Hybrid Rule and Example-based Method for Machine Translation," NTT Communication Science Laboratories, pp. 1-5. (NPL0181).
"Sobashima et al., ""A Bidirectional Transfer-Driven Machine Translation System for Spoken Dialogues,"" 1994, Proc.of 15th Conference on Computational Linguistics, vol. 1, pp. 64-68. (NPL0182)".
"Soricut et al., ""Using a Large Monolingual Corpus to Improve Translation Accuracy,"" 2002, Lecture Notes in Computer Science, vol. 2499, Proc. of the 5th Conference of the Association for Machine Translation in theAmericas on Machine Translation: From Research to Real Users, pp. 155-164. (NPL0183)".
"Stalls, B. and Knight, K., ""Translating Names and Technical Terms in Arabic Text,"" 1998, Proc. of the COLING/ACL Workshop on Computational Approaches to Semitic Language. (NPL0184)".
"Sumita et al., ""A Discourse Structure Analyzer for Japanese Text,"" 1992, Proc. of the International Conference onFifth Generation Computer Systems, vol. 2, pp. 1133-1140. (NPL0185)".
"Sun et al., ""Chinese Named Entity Identification Using Class-based Language Model,"" 2002, Proc. of 19thInternational Conference on Computational Linguistics, Taipei, Taiwan, vol. 1, pp. 1-7. (NPL0186)".
Tanaka, K. and Iwasaki, H. "Extraction of Lexical Translations from Non-Aligned Corpora," Proceedings of COLING 1996 (NPL0187).
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ. (NPL0189).
"Taylor et al., ""The Penn Treebank: An Overview,"" in A. Abeill (ed.), D Treebanks: Building and Using ParsedCorpora, 2003, pp. 5-22. (NPL0190)".
"Tiedemann, Jorg, ""Automatic Construction of Weighted String Similarity Measures,"" 1999, In Proceedings ofthe Joint SIGDAT Conference on Emperical Methods in Natural Language Processing and Very Large Corpora. (NPL0191)".

(56) References Cited

OTHER PUBLICATIONS

"Tillman, C. and Xia, F., ""A Phrase-Based Unigram Model for Statistical Machine Translation,"" 2003, Proc. of theNorth American Chapter of the ACL on Human Language Technology, vol. 2, pp. 106-108. (NPL0192)".

"Tillmann et al., ""A DP Based Search Using Monotone Alignments in Statistical Translation,"" 1997, Proc. of theAnnual Meeting of the ACL, pp. 366-372. (NPL0193)".

Tomas, J., "Binary Feature Classification for Word Disambiguation in Statistical Machine Translation," Proceedings of the 2nd Int'l. Workshop on Pattern Recognition, 2002, pp. 1-12. (NPL0194).

Uchimoto, K. et al., "Word Translation by Combining Example-Based Methods and Machine Learning Models," Natural LanguageProcessing (Shizen Gengo Shori), vol. 10, No. 3, Apr. 2003, pp. 87-114. (NPL0195).

Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation) (NPL0196).

"Ueffing et al., ""Generation of Word Graphs in Statistical Machine Translation,"" 2002, Proc. of Empirical Methods inNatural Language Processing (EMNLP), pp. 156-163. (NPL0197)".

Varga et al., "Parallel Corpora for Medium Density Languages", In Proceedings of RANLP 2005, pp. 590-596 (NPL0198).

"Veale, T. and Way, A., ""Gaijin: A Bootstrapping, Template-Driven Approach to Example-Based MT,"" 1997, Proc. ofNew Methods in Natural Language Processing (NEMPLP97), Sofia, Bulgaria. (NPL0199)".

Vogel et al., "The CMU Statistical Machine Translation System," 2003, Machine Translation Summit IX, New Orleans, LA. (NPL0200).

"Vogel et al., ""The Statistical Translation Module in the Verbmobil System,"" 2000, Workshop on Multi-Lingual SpeechCommunication, pp. 69-74. (NPL0201)".

"Vogel, S. and Ney, H., ""Construction of a Hierarchical Translation Memory,"" 2000, Proc. of Cooling 2000, Saarbrucken, Germany, pp. 1131-1135. (NPL0202)".

"Wang, Y. and Waibel, A., ""Decoding Algorithm in Statistical Machine Translation,"" 1996, Proc. of the 35th AnnualMeeting of the ACL, pp. 366-372. (NPL0204)".

"Wang, Ye-Yi, ""Grammar Inference and Statistical Machine Translation,"" 1998, Ph.D Thesis, Carnegie MellonUniversity, Pittsburgh, PA. (NPL0205)".

"Watanabe et al., ""Statistical Machine Translation Based on Hierarchical Phrase Alignment,"" 2002, 9th InternationalConference on Theoretical and Methodological Issues in Machin Translation (TMI-2002), Keihanna, Japan, pp. 188-198. (NPL0206)".

"Witbrock, M. and Mittal, V., ""Ultra-Summarization: A Statistical Approach to Generating Highly Condensed Non-Extractive Summaries,"" 1999, Proc. of SIGIR '99, 22nd International Conference on Research and Development inInformation Retrieval, Berkeley, CA, pp. 315-16. (NPL0207)".

"Wu, Dekai, ""A Polynomial-Time Algorithm for Statistical Machine Translation,"" 1996, Proc. of 34th Annual Meeting ofthe ACL, pp. 152-158. (NPL0208)".

"Wu, Dekai, ""Stochastic Inversion Transduction Grammars and Bilingual Parsing of Parallel Corpora,"" 1997, Computational Linguistics, vol. 23, Issue 3, pp. 377-403. (NPL0209)".

"Yamada, K. and Knight, K. ""A Syntax-Based Statistical Translation Model,"" 2001, Proc. of the 39th AnnualMeeting of the ACL, pp. 523-530. (NPL0210)".

"Yamada, K. and Knight, K., ""A Decoder for Syntax-Based Statistical MT,"" 2001, Proceedings of the 40th AnnualMeeting of the ACL, pp. 303-310. (NPL0211)".

Yamada K., "A Syntax-Based Statistical Translation Model," 2002 PhD Dissertation, pp. 1-141. (NPL0212).

"Yamamoto et al., ""A Comparative Study on Translation Units for Bilingual Lexicon Extraction,"" 2001, JapanAcademic Association for Copyright Clearance, Tokyo, Japan. (NPL0213)".

Yamamoto et al, "Acquisition of Phrase-level Bilingual Correspondence using Dependency Structure" In Proceedings of COLING-2000, pp. 933-939 (NPL0214).

"Yarowsky, David, ""Unsupervised Word Sense Disambiguation Rivaling Supervised Methods,"" 1995, 33rd AnnualMeeting of the ACL, pp. 189-196. (NPL0215)".

"Bangalore, S. and Rambow, O., ""Using TAGs, a Tree Model, and a Language Model for Generation,"" May 2000,Workshop TAG+5, Paris. (NPL0017)".

Gale, W. and Church, K., "A Program for Aligning Sentences in Bilingual Corpora," 1993, Computational Linguistics, vol. 19, No. 1, pp. 75-102 (NPL0064).

"Abney, Steven P. , ""Parsing by Chunks,"" 1991, Principle-Based Parsing: Computation and Psycholinguistics, vol. 44,pp. 257-279. (NPL0001)".

Agbago, A., et al., "True-casing for the Portage System," In Recent Advances in Natural Language Processing (Borovets, Bulgaria), Sep. 21-23, 2005, pp. 21-24. (NPL0002).

Al-Onaizan et al., "Statistical Machine Translation," 1999, JHU Summer Tech Workshop, Final Report, pp. 1-42. (NPL0003).

"Al-Onaizan et al., ""Translating with Scarce Resources,"" 2000, 17th National Conference of the American Associationfor Artificial Intelligence, Austin, TX, pp. 672-678. (NPL0004)".

Al-Onaizan, Y. and Knight K., "Machine Transliteration of Names in Arabic Text," Proceedings of ACL Workshop on Computational Approaches to Semitic Languages. Philadelphia, 2002. (NPL0006).

"Al-Onaizan, Y. and Knight, K., ""Named Entity Translation: Extended Abstract"", 2002, Proceedings of HLT-02, SanDiego, CA. (NPL0007)".

"Al-Onaizan, Y. and Knight, K., ""Translating Named Entities Using Monolingual and Bilingual Resources,"" 2002, Proc. of the 40th Annual Meeting of the ACL, pp. 400-408. (NPL0008)".

"Alshawi et al., ""Learning Dependency Translation Models as Collections of Finite-State Head Transducers,"" 2000, Computational Linguistics, vol. 26, pp. 45-60. (NPL0010)".

Alshawi, Hiyan, "Head Automata for Speech Translation", Proceedings of the ICSLP 96, 1996, Philadelphia, Pennslyvania. (NPL0011).

Ambati, V., "Dependency Structure Trees in Syntax Based Machine Translation," Spring 2008 Report <http://www.cs.cmu.edu/~vamshi/publications/DependencyMT_report.pdf>, pp. 1-8. (NPL0012).

"Arbabi et al., ""Algorithms for Arabic name transliteration,"" Mar. 1994, IBM Journal of Research and Development,vol. 38, Issue 2, pp. 183-194. (NPL0013)".

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41. (NPL0014).

Ballesteros, L. et al., "Phrasal Translation and Query Expansion Techniques for Cross-Language Information Retrieval," SIGIR 97, Philadelphia, PA, © 1997, pp. 84-91. (NPL0015).

"Bangalore, S. and Rambow, O., ""Evaluation Metrics for Generation,"" 2000, Proc. of the 1st International NaturalLanguage Generation Conf., vol. 14, pp. 1-8. (NPL0016)".

"Bangalore, S. and Rambow, O., ""Corpus-Based Lexical Choice in Natural Language Generation,"" 2000, Proc. ofthe 38th Annual ACL, Hong Kong, pp. 464-471. (NPL0018)".

"Bangalore, S. and Rambow, O., ""Exploiting a Probabilistic Hierarchical Model for Generation,"" 2000, Proc. of 18thconf. on Computational Linguistics, vol. 1, pp. 42-48. (NPL0019)".

Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840 (NPL0020).

"Barnett et al., ""Knowledge and Natural Language Processing,"" Aug. 1990, Communications of the ACM, vol. 33,Issue 8, pp. 50-71. (NPL0021)".

"Baum, Leonard, ""An Inequality and Associated Maximization Technique in Statistical Estimation for ProbabilisticFunctions of Markov Processes""', 1972, Inequalities 3:1-8. (NPL0022)".

(56) References Cited

OTHER PUBLICATIONS

Berhe, G. et al., "Modeling Service-based Multimedia Content Adaptation in Pervasive Computing," CF '04 (Ischia, Italy) Apr. 14-16, 2004, pp. 60-69. (NPL0023).
Boitet, C. et al., "Main Research Issues in Building Web Services for Mutualized, Non-Commercial Translations," Proc. Of the 6th Symposium on Natural Language Processing, Human and Computer Processing of Language and Speech, © 2005, pp. 1-11. (NPL0025).
"Brants, Thorsten, ""TnT—A Statistical Part-of-Speech Tagger,"" 2000, Proc. of the 6th Applied Natural LanguageProcessing Conference, Seattle. (NPL0026)".
Brill, Eric, "Transformation-Based Error-Driven Learning and Natural Language Processing: A Case Study in Part of Speech Tagging", 1995, Assocation for Computational Linguistics, vol. 21, No. 4, pp. 1-37 (NPL0027).
"Brill, Eric. ""Transformation-Based Error-Driven Learning and Natural Language Processing: A Case Study in Partof Speech Tagging"",1995, Computational Linguistics, vol. 21, No. 4, pp. 543-565. (NPL0028)".
"Brown et al., ""A Statistical Approach to Machine Translation,"" Jun. 1990, Computational Linguistics, vol. 16, No. 2, pp. 79-85. (NPL0029)".
Brown et al., "Word-Sense Disambiguation Using Statistical Methods," 1991, Proc. of 29th Annual ACL, pp. 264-270. (NPL0030).
"Brown et al., ""The Mathematics of Statistical Machine Translation: Parameter Estimation,"" 1993, ComputationalLinguistics, vol. 19, Issue 2, pp. 263-311. (NPL0031)".
"Brown, Ralf, ""Automated Dictionary Extraction for ""Knowledge-Free"" Example-Based Translation,"" 1997, Proc. of 7th Int'l Cont. on Theoretical and Methodological Issues in MT, Santa Fe, NM, pp. 111-118. (NPL0032)".
"Callan et al., ""TREC and TIPSTER Experiments with Inquery,"" 1994, Information Processing and Management,vol. 31, Issue 3, pp. 327-343. (NPL0033)".
Callison-Burch, C. et al., "Statistical Machine Translation with Word- and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1. (NPL0034).
"Carl, Michael. ""A Constructivist Approach to Machine Translation,"" 1998, New Methods of Language Processingand Computational Natural Language Learning, pp. 247-256. (NPL0035)".
"Chen, K. and Chen, H., ""Machine Translation: An Integrated Approach,"" 1995, Proc. of 6th Int'l Cont. on Theoreticaland Methodological Issue in MT, pp. 287-294. (NPL0036)".
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53. (NPL0037).
Cheung et al., "Sentence Alignment in Parallel, Comparable, and Quasi-comparable Corpora", In Proceedings of LREC, 2004, pp. 30-33 (NPL0038).
Chinchor, Nancy, "MUC-7 Named Entity Task Definition," 1997, Version 3.5. (NPL0039).
"Clarkson, P. and Rosenfeld, R., ""Statistical Language Modeling Using the CMU-Cambridge Toolkit"", 1997, Proc. ESCA Eurospeech, Rhodes, Greece, pp. 2707-2710. (NPL0040)".
Cohen et al., "Spectral Bloom Filters," SIGMOD 2003, Jun. 9-12, 2003, ACM pp. 241-252 (NPL0041).
Cohen, "Hardware-Assisted Algorithm for Full-text Large-Dictionary String Matching Using n-gram Hashing," 1998, Information Processing and Management, vol. 34, No. 4, pp. 443-464. (NPL0042).
Cohen, Yossi, "Interpreter for FUF," (available at ftp:/lftp.cs.bgu. ac.il/ pUb/people/elhadad/fuf-life.lf). (NPL0043).

"Corston-Oliver, Simon, ""Beyond String Matching and Cue Phrases: Improving Efficiency and Coverage inDiscourse Analysis""", 1998, The AAAI Spring Symposium on Intelligent Text Summarization, pp. 9-15. (NPL0044)".
Covington, "An Algorithm to Align Words for Historical Comparison", Computational Linguistics, 1996, 22(4), pp. 481-496 (NPL0045).
"Dagan, I. and Itai, A., ""Word Sense Disambiguation Using a Second Language Monolingual Corpus"", 1994, Association forComputational Linguistics, vol. 20, No. 4, pp. 563-596. (NPL0046)".
"Dempster et al., ""Maximum Likelihood from Incomplete Data via the EM Algorithm""", 1977, Journal of the RoyalStatistical Society, vol. 39, No. 1, pp. 1-38. (NPL0047)".
"Diab, M. and Finch, S., ""A Statistical Word-Level Translation Model for Comparable Corpora,"" 2000, In Proc.of theConference on Content Based Multimedia Information Access (RIAO). (NPL0048)".
"Diab, Mona, ""An Unsupervised Method for Multilingual Word Sense Tagging Using Parallel Corpora: APreliminary Investigation""", 2000, SIGLEX Workshop on Word Senses and Multi-Linguality, pp. 1-9. (NPL0049)".
Eisner, Jason, "Learning Non-Isomorphic Tree Mappings for Machine Translation," 2003, in Proc. of the 41st Meeting of the ACL, pp. 205-208. (NPL0050).
Elhadad et al., "Floating Constraints in Lexical Choice", 1996, ACL, vol. 23 No. 2, pp. 195-239. (NPL0051).
"Elhadad, M. and Robin, J., ""An Overview of Surge: a Reusable Comprehensive Syntactic RealizationComponent,"" 1996, Technical Report 96-03, Department of Mathematics and Computer Science, Ben GuironUniversity, Beer Sheva, Israel. (NPL0052)".
Elhadad, M. and Robin, J., "Controlling Content Realization with Functional Unification Grammars", 1992, Aspects of Automated Natural Language Generation, Dale et al. (eds)., Springer Verlag, pp. 89-104. (NPL0053).
Huang et al., "A syntax-directed translator with extended domain of locality," Jun. 9, 2006, In Proceedings of the Workshop on Computationally Hard Problmens and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.
Papineni et al., "Bleu: a Method for Automatic Evaluation of Machine Translation", Proc. Of the 40th Annual Meeting of the Association for Computational Linguistics (ACL), Jul. 2002, pp. 311-318.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in CONTRAST—A Context-Based Machine Translation System", 1995, Systems and Computers in Japan, vol. 26, No. 14, pp. 37-53.
Graehl, J and Knight, K, May 2004, Training Tree Transducers, In NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
Liu et al., "Context Discovery Using Attenuated Bloom Filters in Ad-Hoc Networks," Springer, pp. 13-25, 2006.
First Office Action dated Jun. 7, 2004 in Canadian Patent Application 2408819, filed May 11, 2001.
First Office Action dated Jun. 14, 2007 in Canadian Patent Application 2475857, filed Mar. 11, 2003.
Office Action dated Mar. 26, 2012 in German Patent Application 10392450.7, filed Mar. 28, 2003.
First Office Action dated Nov. 5, 2008 in Canadian Patent Application 2408398, filed Mar. 27, 2003.
Second Office Action dated Sep. 25, 2009 in Canadian Patent Application 2408398, filed Mar. 27, 2003.

(56) References Cited

OTHER PUBLICATIONS

First Office Action dated Mar. 1, 2005 in European Patent Application No. 03716920.8, filed Mar. 27, 2003.
Second Office Action dated Nov. 9, 2006 in European Patent Application No. 03716920.8, filed Mar. 27, 2003.
Third Office Action dated Apr. 30, 2008 in European Patent Application No. 03716920.8, filed Mar. 27, 2003.
Office Action dated Oct. 25, 2011 in Japanese Patent Application 2007-536911 filed Oct. 12, 2005.
Office Action dated Jul. 24, 2012 in Japanese Patent Application 2007-536911 filed Oct. 12, 2005.
Final Office Action dated Apr. 9, 2013 in Japanese Patent Application 2007-536911 filed Oct. 12, 2005.
Office Action dated May 13, 2005 in Chinese Patent Application 1812317.1, filed May 11, 2001.
Office Action dated Apr. 21, 2006 in Chinese Patent Application 1812317.1, filed May 11, 2001.
Office Action dated Jul. 19, 2006 in Japanese Patent Application 2003-577155, filed Mar. 11, 2003.
Office Action dated Mar. 1, 2007 in Chinese Patent Application 3805749.2, filed Mar. 11, 2003.
Office Action dated Feb. 27, 2007 in Japanese Patent Application 2002-590018, filed May 13, 2002.
Office Action dated Jan. 26, 2007 in Chinese Patent Application 3807018.9, filed Mar. 27, 2003.
Office Action dated Dec. 7, 2005 in Indian Patent Application 2283/DELNP/2004, filed Mar. 11, 2003.
Office Action dated Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action dated Aug. 29, 2006 in Japanese Patent Application 2003-581064, filed Mar. 27, 2003.
Office Action dated Jan. 26, 2007 in Chinese Patent Application 3807027.8, filed Mar. 28, 2003.
Office Action dated Jul. 25, 2006 in Japanese Patent Application 2003-581063, filed Mar. 28, 2003.
Huang et al. "Automatic Extraction of Named Entity Translingual Equivalence Based on Multi-Feature Cost Minimization". In Proceedings of the ACL 2003 Workshop on Multilingual and Mixed-Language Name Entry Recognition.
Notice of Allowance dated Dec. 10, 2013 in Japanese Patent Application 2007-536911, filed Oct. 12, 2005.
Makoushina, J. "Translation Quality Assurance Tools: Current State and Future Approaches." Translating and the Computer, Dec. 17, 2007, 29, 1-39, retrieved at <http://www.palex.ru/fc/98/Translation%20Quality%Assurance%20Tools.pdf>.
Specia et al. "Improving the Confidence of Machine Translation Quality Estimates," MT Summit XII, Ottawa, Canada, 2009, 8 pages.
Soricut et al., "TrustRank: Inducing Trust in Automatic Translations via Ranking", published In Proceedings of the 48th Annual Meeting of the Association for Computational Linguistics (Jul. 2010), pp. 612-621.
U.S. Appl. No. 11/454,212, filed Jun. 15, 2006.
Summons to Attend Oral Proceedings mailed Sep. 18, 2014 in German Patent Application 10392450.7, filed Mar. 28, 2003.
Examination Report dated Jul. 22,2013 in German Patent Application 112005002534.9, filed Oct. 12, 2005.
Leusch et al.. , "A Novel String-to-String Distance Measure with Applications to Machine Translation Evaluation", 2003, https://www-i6.informatik.rwth-aachen.de, pp. 1-8.
Oflazer, Kemal., "Error-tolerant Finite-state Recognition with Application to Morphological Analysis and Spelling Correction", 1996, https://www.ucrel.lancs.ac.uk, pp. 1-18.
Snover et al., "A Study of Translation Edit Rate with Targeted Human Annotation", 2006, https://www.cs.umd.edu/~snover/pub/amta06/ter_amta.pdf, pp. 1-9.
Levenshtein, V.I., "Binary Codes Capable of Correcting Deletions, Insertions, and Reversals", 1966, Doklady Akademii Nauk SSSR, vol. 163, No. 4, pp. 707-710.
Office Action dated Feb. 2, 2015 in German Patent Application 10392450.7, filed Mar. 28, 2003.
Abney, Steven P. , "Parsing by Chunks," 1994, Bell Communications Research, pp. 1-18.
Kumar, Shankar, "Minimum Bayes-Risk Techniques in Automatic Speech Recognition and Statistical Machine Translation: A dissertation submitted to the Johns Hopkins University in conformity with the requirements for the degree of Doctor of Philosophy," Baltimore, MD Oct. 2004.
Gao et al., Proceedings of the Joint Fifth Workshop on Statistical Machine Translation and Metrics (MATR), 2010, pp. 121-126.
Cllison-Burch et al., "Findings of the 2011 Workshop on Statistical Machine Translation," In Proceedings of the Sixth Workshop on Statistical Machine Translation, Edinburgh, Scotland, July. Association for Computational Linguistics, 2011, pp. 22-64.
Bohar et al., "A Grain of Salt for the WMT Manual Evaluation," In Proceedings of the Sixth Workshop on Statistical Machine Translation, Edinburgh, Scotland, Association for Computational Linguistics, Jul. 2011, pp. 1-11.
Przybocki et al., "GALE Machine Translation Metrology: Definition, Implementation, and Calculation," Chapter 5.4 in Handbook of Natural Language Processing and Machine Translation, Olive et al., eds., Springer, 2011, pp. 783-811.
Snover et al., "Fluency, Adequacy, or HTER? Exploring Different Human Judgements with a Tunable MT Metric", In Proceedings of the Fourth Workshop on Statitstical Machine Translation at the 12th Meeting of the EACL, pp. 259-268, 2009.
Cormode et al., "The String Edit Distance Matching Problem with Moves," in ACM Transactions on Algorithms (TALG), 3(1):1-19, 2007.
Kanthak et al., "Novel Reordering Approaches in Phrase-Based Statistical Machine Translation," In Proceedings of the ACL Workshop on Building and Using Parallel Texts, Jun. 2005, pp. 167-174.
Allauzen et al., "OpenFst: A General and Efficient Weighted Finitestate Transducer Library," In Proceedings of the 12th International Conference on Implementation and Application of Automata (CIAA), 2007, pp. 11-23.
Denkowski et al., "Meteor 1.3: Automatic Metric for Reliable Optimization and Evaluation of Machine Translation Systems," In Proceedings of the EMNLP 2011 Workshop on Statistical Machine Translation, Jul. 2011, pp. 85-91.
Lavie et al., "The Meteor Metric for Automatic Evaluation of Machine Translation," Machine Translation, Sep. 2009, 23: 105-115.
Rammer et al., "On the Algorithmic Implementation of Multi-Class SVMs," In Journal of Machine Learning Reseach 2, Dec. 2001, pp. 265-292.
Dreyer, Markus et al., "HyTER: Meaning-Equivalent Semantics for Translation Evaluation," in Proceedings of the 2012 Conference of the North American Chapter of the Association of Computational Linguistics: Human Language Technologies. Jun. 3, 2012. 10 pages.
Przybocki, M.; Peterson, K.; Bronsart, S.; Official results of the NIST 2008 "Metrics for MAchine TRanslation" Challenge (MetricsMATR08), 7 pages. http://nist.gov/speech/tests/metricsmatr/2008/results/; https://www.nist.gov/multimodal-information-group/metrics-machine-translation-evaluation#history; https://www.nist.gov/itl/iad/mig/metrics-machine-translation-2010-evaluation.
"Office Action," German Application No. 112005002534.9, dated Feb. 7, 2018, 6 pages (9 pages including translation).
Non-Final Office Action, dated Aug. 17, 2017, U.S. Appl. No. 13/481,561, filed May 25, 2012.
Final Office Action, dated Sep. 12, 2017, U.S. Appl. No. 11/272,460, filed Nov. 9, 2005.
Shahahbi, Mitra, "An Evaluation of Output Quality of Machine

(56) References Cited

OTHER PUBLICATIONS

Translation Program", 2009, Student Research RANLP 2009—Borovets, Bulgaria, pp. 71-75.

* cited by examiner

SYSTEMS AND METHODS FOR MONITORING POST TRANSLATION EDITING

BACKGROUND

1. Technical Field

The present disclosure generally relates to systems and methods for determining a risk-reduced word price for an editor to edit an editing job. More particularly, but not by way of limitation, the present disclosure relates to systems and methods for determining a benchmark based on the editing time of a preferred editor editing a first editing job, and determining a risk-reduced word price for the remaining editing jobs of a batch job based on the benchmark.

2. Description of Related Art

In the field of editing, an editor can be provided content (e.g., a text document) that requires editing. The editor generally edits the content and may be paid based on the number of words edited (i.e., based on what is commonly referred to as a word price). Oftentimes, it is difficult to determine the amount of work needed to edit the content before editing because of such factors as the initial quality of the content, the technological area of the provided content, as well as other factors understood in the art, many of which are not known prior to the editor undertaking the editing job. This presents a risk to the editors and a risk to the individual/company setting the word price because a relatively simple editing job can be priced the same as a relatively difficult editing job. For a relatively simple editing job, the editor can be at an advantage because they can complete the editing job rather quickly and at the set word price. Alternatively, the individual can be at a disadvantage for a complex editing job because it can take a longer time to complete the editing job, yet at the same word price.

In the field of language translation and post-translation editing, language translation services may generally be performed in two steps—the initial attempt at translation by a translator (sometimes performed by a machine—a "machine translation"), followed by a round of post-translation edits to correct any mistakes in the translation. Previously, post-translation editors would negotiate a word price (e.g., 10 cents per word) for performing post-translation edits before they see the content to be edited. This involves some risk for the post-translation editor because they don't know if the translated content requires minor corrections and can be edited quickly or requires major corrections and will take a long time to edit. Hence, they are taking a risk in negotiating a fixed word price to perform post-translation edits because they do not know the length of time required to edit the content (they get paid per edited word, not per hour).

SUMMARY OF THE INVENTION

Various aspects provide for a method to determine a risk-reduced word price for editing. The method can include the step of providing to a first group of one or more editors a first editing job from a batch job. The method can include the step of determining an editing time of the first group of one or more editors editing the first editing job. The method can include the step of calculating a word price for editing a subsequent editing job of the batch job based on the editing time.

Various aspects provide for a system adapted to determine a risk-reduced word price for editing. The system may include a processing system having instructions stored on a non-transitory computer-readable medium. The instructions can be executed by the processing system. The processing system executing the instructions can provide to one or more preferred editors a first portion of editing jobs from a batch job. The processing system executing the instructions can determine a production speed of the one or more preferred editors editing the first portion of editing jobs. The processing system executing the instructions can calculate a word price for editing a remaining portion of editing jobs of the batch job based on the production speed.

Various aspects also provide for a method to determine a risk-reduced word price for editing. The method may include the step of providing, by a processing system operating on a network, to one or more editors a plurality of editing jobs from a batch job. The method may include the step of determining, in real-time by the processing system, a production speed of the one or more editors editing a first percentage of the editing jobs. The method can include the step of generating, by the processing system, a benchmark based on the production speed of the one or more editors editing the first percentage of the editing jobs. The method can include calculating, by the processing system, a word price for editing a remaining portion of the editing jobs of the batch job based on the benchmark.

DETAILED DESCRIPTION OF THE INVENTION

Figure 1:
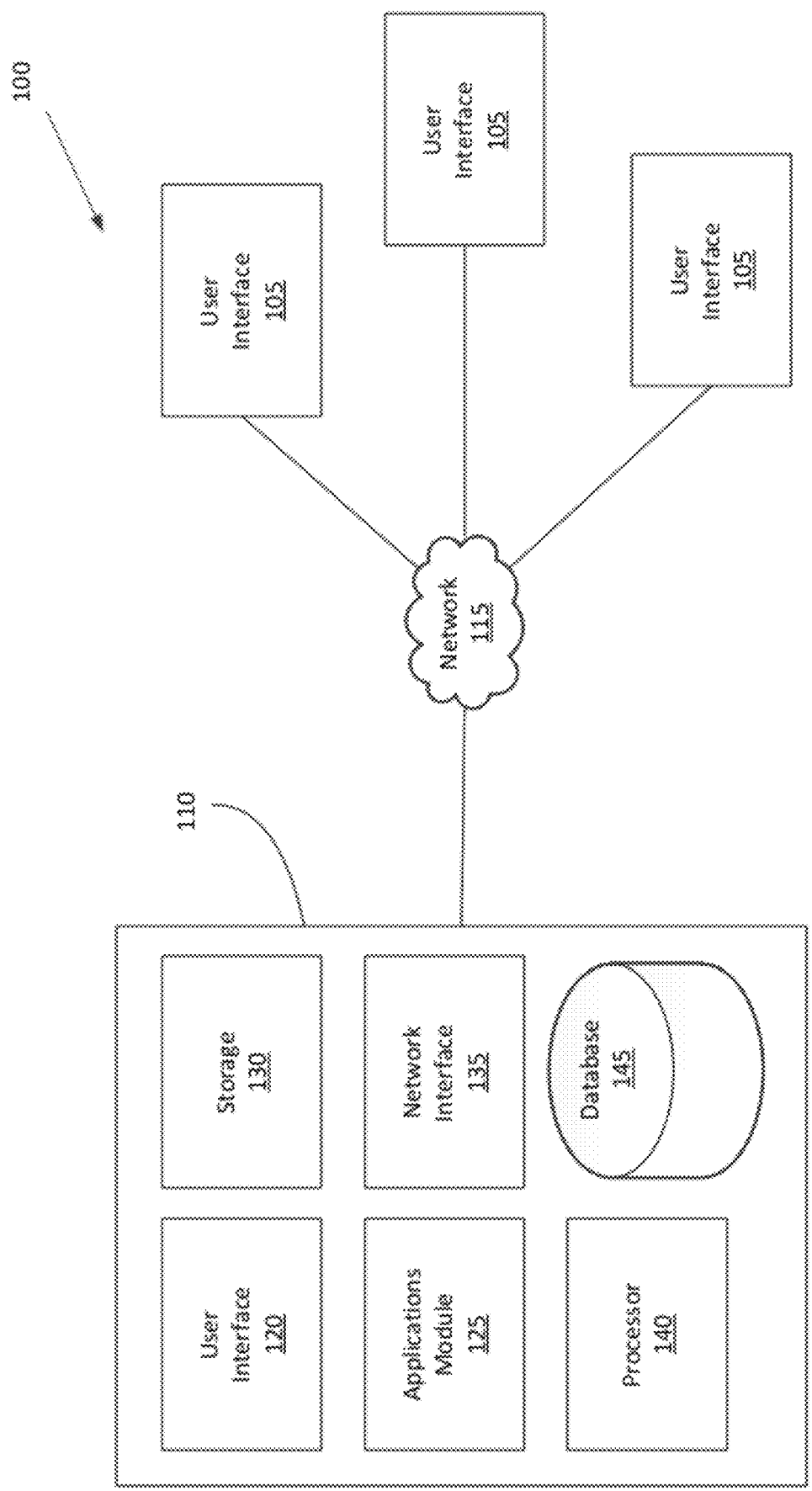
FIG. 1 is a block diagram of an exemplary architecture of a system for determining a price for edits which may be utilized to practice aspects of the present disclosure.

Before explaining the presently disclosed and claimed inventive concept(s) in detail by way of exemplary embodiments, drawings, and appended claims, it is to be understood that the present disclosure is not limited in its application to the details of construction and the arrangement of the components set forth in the following description or illustrated in the drawings. The present disclosure is capable of other embodiments or of being practiced or carried out in various ways. As such, the language used herein is intended to be given the broadest possible scope and meaning; and the embodiments are meant to be exemplary—not exhaustive. It is to be understood that the phraseology and terminology employed herein is for the purpose of description and should not be regarded as limiting. Unless otherwise required by context, singular terms may include pluralities and plural terms may include the singular.

It is to be understood that the term "administrator" as used herein generally refers to an individual, company, or other entity that provides content to editors to be edited. The administrator may be an online translator service that receives content from a content provider, translates the content using human translators or a "machine translation," and then provides the translated content to editors to correct translation mistakes. The administrator can utilize, operate, or otherwise control a processing system adapted to carry out the presently disclosed methodology.

It is to be understood that the term "preferred editor" or "preferred editors" used herein generally refers to an editor that has a proven history of editing, typically with a given administrator. The preferred editor may have worked with an administrator over a period of time and have a proven ability and desire to edit editing jobs at a predetermined editing quantity and/or editing quality. A preferred editor may have established a predetermined production speed. In some embodiments, a non-preferred editor may be one who delivers a low volume, such as, for example, fewer than 1.0 job per week. However, numbers greater and smaller than 1.0 are contemplated in some embodiments. In some embodiments, a non-preferred editor may be one who delivers low quality, such as, for example, greater than 0.1 points below a requested quality level. However, numbers greater and smaller than 0.1 are contemplated in some embodiments.

In some embodiments, a preferred editor may be one who delivers a high volume, such as, for example, greater than 1.0 job per day. However, numbers greater and smaller than 1.0 are contemplated in some embodiments. In some embodiments, a preferred editor may be one who delivers high quality, such as, for example, greater than 0.4 points above a requested quality level with fewer than 5.0 percent of segments below the requested quality level. However, numbers greater and smaller than 0.4 and 5.0 percent are contemplated in some embodiments. In other embodiments, a preferred editor may be one who delivers high quality, such as, for example, greater than 0.1 points above a requested quality level with fewer than 1.0 percent of segments below the requested quality level. However, numbers greater and smaller than 0.1 and 1.0 percent are contemplated in some embodiments.

In one exemplary scenario, a machine translation output may be assigned a quality level of 2.8, and a preferred editor quality level may be requested at quality level 4.0. In this example, one who would deliver 0.9 jobs per week or an average of 3.8 quality level may not be considered to be a preferred editor in some embodiments. In this example, one who would deliver 10 jobs per week and an average quality level of 4.2 may be considered to be a preferred editor.

In some embodiments, one who would deliver 5.0 jobs per week and an average quality of 3.9 may be considered to be a risky editor, may not be used for benchmarking, and may be removed from the listed of trusted editors. In some embodiments, risk may be calculated as delivered volume*delivered quality level/1000.

Generally, systems and methods provided herein may be adapted to determine a risk-reduced word price for performing an editing job, e.g., determining a risk-reduced word price for post-translation editing that reduces the risk associated with pricing edits. The risk may be reduced for the editor editing the editing job and for the administrator providing the editing job to the editor. The administrator may provide a first editing job (also referred to as a first portion of editing jobs or as the "benchmark jobs") from a batch job to a first group of one or more editors, or preferred editors in order to determine an editing time indicative of the time it took the editors to edit the content. Based on the editing time of the preferred editors, the administrator, using the processing system, can determine a risk-reduced word price for editors editing the remaining editing jobs from the batch job. However, in some embodiments editing time is not considered. Editing quality and quantity are often important factors to consider.

More particularly, the administrator may receive a batch job, which may be a single document, from a content provider (e.g., a single document needing to be translated and then edited to correct translation mistakes). The administrator may break the batch job apart, or otherwise divide the batch job, using for example a processing system, into a plurality of individual editing jobs and provide a percentage or portion of the editing jobs (e.g., the first editing job or the benchmark jobs) to a first group of one or more preferred editors for editing. The percentage of editing jobs (benchmark jobs) provided to the preferred editors can be between 1 and 20 percent, between 5 and 15 percent, 10 percent, or any other suitable percentage. The administrator may first translate the batch job from a first (source) language to a second (target) language (e.g., from English to German), and then provide the percentage of editing jobs (or first editing job) to the first group of one or more preferred editors for post-translation edits.

The preferred editors may edit the jobs wherein the processing system, or an application stored on a preferred (one or more) editor's user interface, may record an editing time indicative of the time it took the one or more preferred editors to edit the editing jobs. The processing system, or an application stored on the preferred editor's user interface may record a production speed that may generally be understood to be based on the editing time and the number of words in the editing job.

In some embodiments, the system may determine a risk-reduced word price for performing edits on a second editing job (also referred to as a remaining portion of editing jobs) (e.g., post-translation edits) ahead of time by establishing a benchmark for how long the edits will take and deriving the price to edit from the benchmark. If the benchmark indicates the translation can be performed quickly, the fee paid per word for edits can be less. If the benchmark indicates the translation will take longer, then the fee paid per word for post-translation edits can be greater.

The administrator, using the processing system, may use the editing time and/or the production speed from the one or more preferred editors for: 1) calculating a word price to pay editors for editing the remaining percentage or portion of the editing jobs (second editing job) of the batch job, or 2) for determining a benchmark to be used to calculate the price for editors to edit the remaining jobs. In some embodiments, when determining a risk-reduced word price various elements may be considered (e.g., registered time on benchmark jobs, and the full word price that is known to the system). In alternate embodiments, other elements may be considered.

The full word price is the reference unit word price commonly used for translation jobs. The full word price may depend on the language pair. For example, ENG-SPA may be less expensive than ENG-DAN. The full word price may also depend on the domain. For example, translation of a text related to pharmaceuticals may be more expensive than translation of a text related to travel, even when the word count and language pair are identical. In some embodiments, these variables may be captured in a full word price that is linked to domain and language pair. In some embodiments, when determining a benchmark, other factors may also be used to calculate a risk-reduced word price, including type of batch job (e.g., scientific content, medical content, legal content, and so forth), the daily revenue or income an editor expects to have as a daily income, a human translation full word price, a human translation speed, etc.

Generally, exemplary systems and methods described herein may offer administrators a mechanism for determining a risk-reduced word price for editing by providing a percentage of editing jobs (benchmark jobs) from a batch job to preferred editors, at a full or increased word price, and then determining a reduced risk word price for the remaining portions of editing jobs from the batch jobs based on information from the preferred editors editing the percentage of editing jobs. Exemplary information from the preferred editors includes a production speed, an editing time, an editing quality, an editing quantity, and the like.

Some exemplary systems and methods may dynamically determine a risk-reduced word price for the remaining portions of the editing jobs from the batch job as the preferred editors edit the percentage of editing jobs. That is, a processing system can collect the information from the preferred editors in real time, i.e., as they edit the editing jobs, and, using the collected information, dynamically determine or even adjust the risk-reduced word price for the remaining portion of editing jobs from the batch job.

The exemplary systems and methods may determine the risk-reduced price based on the information from the preferred editors upon completion of the preferred editors editing the editing jobs.

Some exemplary systems and methods may adjust the word price based on a stacked pricing scheme, which may generally be described as reducing the word price as the volume of editing jobs increases. That is, as the volume of editing jobs increases for an editor, the word price may be reduced. In some embodiments, the daily income expectations for the editor may be maintained. In other embodiments, the daily income expectations for the editor may not be maintained.

In some aspects, exemplary systems and methods may adjust the word price based on a quality control (QC) corrected scheme (also referred to as a QC corrected pricing schema or a quality checked pricing schema), which may generally be described as adjusting the word price paid to the editor based on the quality of the edits the editor made. Generally, once an editing job is received from an editor, the editing job may be QC checked to determine the quality of the edits. If the editing quality is above a predetermined level, the editor can be paid the full word price. If the editing quality is below a predetermined level, the word price paid to the editor can be reduced. Even further, if the editing quality is below another predetermined level, the word price can be eliminated and the editor may not be paid for their edits. It is envisioned that further thresholds may be implemented. In some aspects, the word price may be adjusted, using the QC corrected pricing scheme, after the editor has completed several editing jobs, rather than for each editing job.

As one example of a QC corrected pricing scheme, an editing job received from an editor may be QC checked and then assigned a number between 1 and 5 based on the quality of the edits, with 5 being indicative of the highest quality edits. If the number assigned is 5, the editor may be paid the full word price and may not receive feedback regarding the quality of their edits. If the number assigned is 4, the word price may be reduced and the editor may receive feedback regarding the quality of their edits. If the number assigned is 3 or below, and the requested quality level (QL) is 5 (for example), the word price may be eliminated completely and the editor may not be paid for their edits and the editor may receive feedback regarding the quality of their edits.

Some examples of possible quality levels that may be implemented follow. The following are just examples and may be changed if desired. Greater or fewer than five levels may be implemented. QL 1 may mean a sentence is not understandable, and it is impossible to extract from it the information it contains.

QL 2 may mean a sentence is hardly understandable, it is difficult to extract from it the information it contains.

QL 3 may mean a sentence is understandable with some effort. The terminology is improper and the word order is inadequate. There are grammar mistakes like wrong agreement or incorrect rendering of tenses; also spelling mistakes are present in the text (missing diacritics & capitalizations, word breaks, hyphenation, punctuation, etc.).

QL 4 may mean a sentence is understandable with no effort. There are some small grammar and/or orthography mistakes made accidentally. The terminology is not very exact, but it still conveys the meaning. The style is a bit awkward for the domain.

QL 5 may mean a sentence is perfectly understandable. The terminology is accurate. The level of language (grammar, orthography, and style) is very close to that of a native speaker. One could not detect this is machine translated output.

In some aspects, exemplary systems and methods may adjust the word price based on a bonus pricing scheme, which may generally be described as adjusting the word price based on the editor identifying and correcting particularly difficult mistakes. Exemplary difficult mistakes corrected by editors and used to adjust the word price using the bonus pricing scheme include: 1—identification and correction of correctly spelled, but inappropriate words (e.g., widow v. window); 2—identification and correction of the proper usage of words (e.g., who/whom, lay/lie, etc.); 3—identification and correction of the proper citations to authoritative works; 4—identification and correction of the proper usage of grammar (e.g., subject-verb agreement, sentence fragments, comma splices and run-on sentences, etc.); and the like.

These and other function and implementation details regarding the systems and methods of the presently described and claimed inventive concepts will be described in greater detail below with reference to the FIGS. 1-5.

Turning now to a the drawings, and in particular to FIG. 1, shown therein and designated by reference numeral 100 is an exemplary architecture of a system adapted to determine a risk-reduced word price for edits which may be utilized to practice aspects of the present disclosure. That is, the exemplary architecture illustrated in FIG. 1 includes hardware, software, and/or combinations thereof, adapted to implement certain aspects of the presently disclosed and claimed inventive concept(s). The exemplary architecture is provided by way of example only and is not intended to be limiting. That is, changes and variations to the exemplary architecture illustrated in FIG. 1 are considered within the scope of the present disclosure.

The system 100 illustrated in FIG. 1 includes one or more user interface(s) 105 (three being shown in FIG. 1 by way of example) connected to a processing system 110 via a network 115. Although FIG. 1 shows one processing system 110 communicating through the network 115 with three user interfaces 105, it is to be understood that the system 100 can include more than one processing system 110 (e.g., more than one server) communicating with more or less user interfaces 105. Also, the processing system 110 can include more than one server.

Generally, the user interface 105 can be associated with an editor and can be adapted to permit the editor to communicate, or otherwise interface with the processing system 110, via the network 115. The user interface 105 can include component(s), logic instructions, and/or combinations thereof, adapted to permit an editor to interface with the processing system 110 to, for example, 1) be provided one or more editing jobs from the processing system 110, 2) edit the one or more editing jobs, 3) optionally record or otherwise monitor a production speed and/or an editing time indicative of the time it took the editor to edit the one or more editing jobs, and/or 4) provide the edited editing job and the editing time and/or production speed to the processing system 110 via the network 115.

The user interface 105 can be adapted to permit the editor to interface with the processing system 110 using, for example, a web browser, to access the editing job over the network 115. The editing job can be stored on the processing system 110 rather than being downloaded to the user interface 105 for editing. The editor can access the editing job and edit the editing job through and using, for example, a series of web pages accessible via the web browser operating on the user interface 105. The processing system 110 can include component(s), logic instructions, and/or combinations thereof adapted to optionally record or monitor the time it took the editor to edit the editing job.

In yet another aspect, the user interface 105 can be adapted to permit the editor to interface with the processing system 110, via the network 115, to download the editing job to the user interface 105, edit the editing job using the on and using the user interface 105, record the production speed and/or editing time indicative of the time it took the editor to edit the editing job, and to upload the edited editing job and the production speed and/or the editing time to the processing system 110.

The user interface 105 can include any general purpose computing system that can implement a web browser application or other suitable applications adapted to request and provide information (such as an editing job) to and from the processing system 110, via the network 115.

Exemplary systems adapted to implement the user interface 105 include a general purpose computing system, a personal computer, a laptop computer, a netbook, a personal digital assistant (PDA), a smart phone, and/or equivalents thereof. Exemplary software applications included on the user interface 105 are a web browser application, a word processor application, a time keeping/tracking application, a communication application, as well as a wide variety of applications understood by one having ordinary skill in the art.

Broadly, the network 115 can be adapted to permit the one or more user interface(s) 105 to communicate with the processing system 110, and vice versa. The network 115 can be implemented via the World Wide Web (WWW), a wide area network (WAN), a local area network (LAN), the Internet, a wireless network, a cellular telephone network, and/or equivalents or combinations thereof.

The processing system 110 can include component(s), logic instructions, and/or combinations thereof, adapted to implement at least a portion of the currently described and claimed inventive concept(s). The processing system 110 can include instructions stored on non-transitory computer readable medium that when executed causes the processing system to determine the risk-reduced word price for performing edits on a remaining portion of editing jobs from the batch job, e.g., post-translation edits, ahead of time by establishing a benchmark for how long the edits will or should take and deriving the word price to edit from the benchmark. The processing system 110 can determine the price for performing edits, e.g., post-translation edits, ahead of time based on the editing time of one or more preferred editors editing the editing job. The processing system 110 may be described as a particular purpose computing system that includes executable instructions that when executed by a processor of the processing system cause the processing system to determine a risk-reduced word price for editing an editing job from a batch job.

As shown in FIG. 1, the processing system 110 can include user interface 120 (also referred to as an input/output (I/O) module), an applications module 125, a storage module 130, a network interface module 135, a processor 140, and one or more databases 145. The user interface 120 includes hardware, logic, and/or combinations thereof that permit the administrator to interface, operate, or otherwise control the processing system 110. Exemplary components included as a part of the user interface 120 can include a keyboard, a mouse, a monitor, a pointing device, a printer, a scanner, and equivalents and/or combinations thereof.

The applications module 125 can include one or more programs, applications, logic instructions, computer executable code, and the like, adapted to operate the processing system 110 as well as to carry out at least a portion of the currently described and claimed inventive concept(s). The storage module 130 may store, for example, the programs and/or applications, operating protocols, and the like, as well as a variety of other processing system 110 parameters, as would be understood in the art. The network interface module 135 can be adapted, or otherwise configured to enable the processing system 110 to communicate via the network 115. The processor 140 may include components, logic instructions, and/or combinations thereof adapted to generally operate the processing system 110, e.g., to calculate the reduced risk word price.

The database 145 includes, for example, information relating to one or more batch jobs, editing jobs, editors, preferred editors, pricing schema, and the like. Although shown as a single database, the database 145 can be implemented as a plurality of internal or external databases, e.g., a relational database, object database, and the like.

It is to be understood that the description provided above regarding the particularities of the exemplary architecture implementing the processing system 110 is provided by way of example and is not to be considered limiting. The processing system 110 can be implemented as described above or with a variety of modifications and/or changes to the architecture without departing from the particular functions described herein. For example, the processing system 110 can be implemented as a stand-alone server, as a web server, as a distributed server system, as an application server, in combination with a database server, and the like. When the processing system 110 is implemented as a webserver, the processing system 110 can communicate with the user interface 105, via the network 115, through a series of web pages. The processing system 110 can be implemented as a single web server or as a distributed processing system including a plurality of server(s) connected to one or more databases, either locally or remotely.

Figure 2:
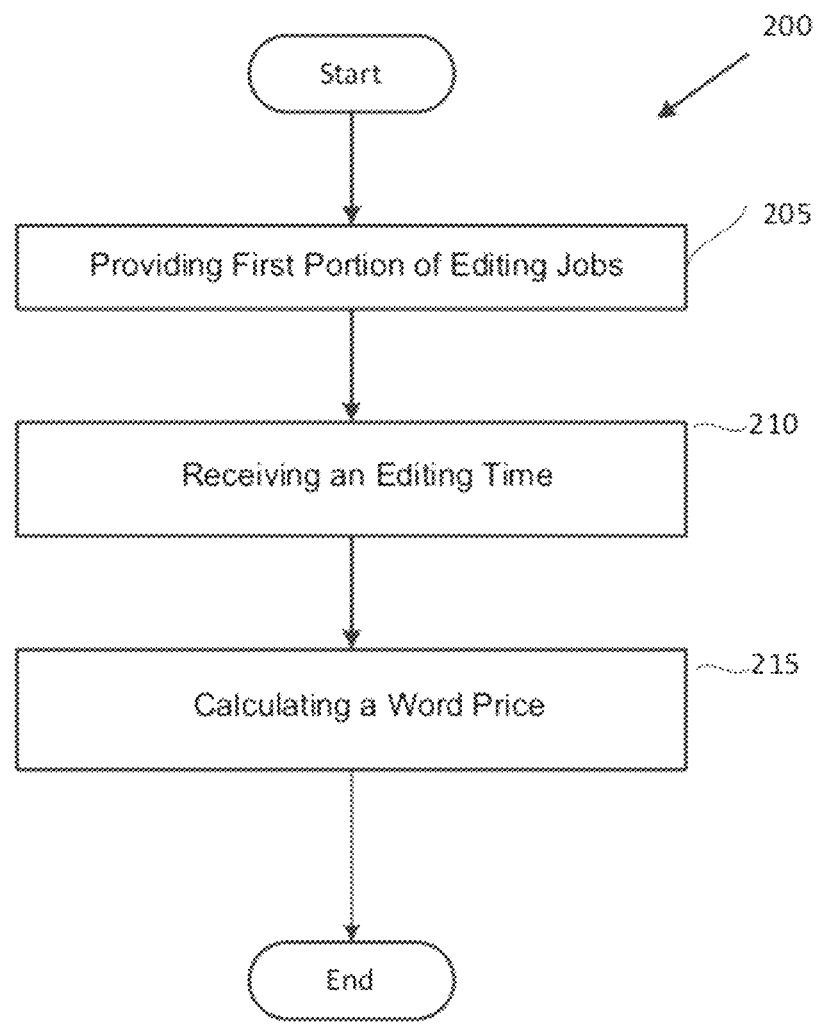
FIG. 2 is a flowchart of one example of a method for determining a risk-reduced word price for editing an editing job, in accordance with the present disclosure.

Turning now to FIG. 2, shown therein is a method 200 for determining a risk-reduced word price for editing, e.g., for post-translation editing. Generally speaking, the steps of the method 200 can be performed by the processing system 110

(e.g., a web server). One of ordinary skill in the art will appreciate that the processing system 110 can be implemented as a plurality of web servers, i.e., the steps of the method 200 may also occur on one or more web servers, one or more presentation servers, or across a distributed computing system such as a cloud computing system, and the like.

The method 200 may include the step 205 of providing, by the processing system 110, to a first group of one or more editors a first editing job from a batch job. A batch job can generally be understood to include content needing to be edited. For instance, a batch job can be a book provided to the administrator which is then uploaded to the processing system 110. In another example, a batch job can be a document translated from source language to a target language. In even another example, the batch job can be translated by the processing system 110, i.e., the processing system 110 can further include a machine translation module.

The batch job may include a plurality of editing jobs. That is, the batch job may be a large document (e.g., a novel, manual, etc.) that is then divided or otherwise broken down into a plurality of editing jobs wherein once each of the editing jobs are edited, the batch job will have been edited. The batch job may be from a single document and/or source so as to ensure that each of the editing jobs included therein are similar in scope, complexity, number and types of mistakes, and so forth. This can ensure that each editor editing the editing jobs will be given substantially similar editing jobs in regards to the time, complexity, and effort needed to edit the editing jobs. The word count in each of the editing jobs can be substantially similar. The word count in each editing job can be substantially different.

Generally, the processing system 110, and/or the administrator using the processing system 110, can determine the first editing job, or the first portion (or percentage) of the editing jobs included in the batch job to be provided to the editors, or preferred editors. The first editing job being provided to the editors can also be referred to as the benchmark jobs, the first portion of editing jobs, the first percentage of editing jobs, etc. The percentage of editing jobs (benchmark jobs) provided to the preferred editors can be between 1 and 20 percent, between 5 and 15 percent, or more preferably 10 percent of the editing jobs from the batch job. This first editing job can then be made available, or otherwise provided to the first group of one or more editors, or preferred editors for editing.

The processing system 110 can provide the first portion (or percentage) of editing jobs, or first editing job to the preferred editors using the user interfaces 105 through a series of web pages wherein the editing jobs are maintained on the processing system 110. The processing system 110 may include logic to track the editing time the one or more preferred editors utilize in editing the editing jobs. The editing time may be tracked in real-time.

The method 200 may include the step 210 of receiving, or otherwise determining an editing time of the first group of one or more editors editing the first editing job. The user interface 105 can include hardware, logic instructions, and combinations thereof that track the editing time the one or more editors take to edit the editing job. (The editing times may be averaged, etc., as discussed herein.) The user interface 105 can transmit or otherwise make available to the processing system 110 the editing time.

The processing system 110 can include logic that monitors in real-time the editing time it takes the one or more preferred editors to edit the editing jobs. The processing system 110 can then store or otherwise record the editing time.

The method 200 may include the step 215 of calculating a word price for editing a subsequent editing job of the batch job based on the editing time of the first group of one or more editors editing the first editing job. The editing time from the preferred editors received in step 210 may be used as a basis to calculate the word price to be paid to editors (e.g., other editors and/or the same preferred editors) editing the remaining portion of the editing jobs from the batch job.

For instance, when a preferred editor with a proven ability to edit a large number of words per hour (or words per day) at an acceptable editing quality actually performs an editing task at twice his average number of words per hour (the editing job is from the first portion of editing jobs), this can generally be considered a simple edit and the word price for the remaining portion or percentage of editing jobs, or the second editing job of the batch job can be reduced. Similarly, when the preferred editor performs an editing task at half his average number of words per hour, this can generally be considered a more difficult editing job and the word price for the remaining portion or percentage of editing jobs of the batch job can be increased.

If desired, the processing system can be adapted to prevent the preferred editors from learning that they are editing a benchmark editing job. Typically, a fixed high price is paid for benchmark jobs. It is generally desirable to remove unknown risks for the benchmarkers in some exemplary embodiments.

The processing system 110 can utilize the editing times determined or received from the plurality of preferred editors editing several benchmark editing jobs to arrive at an average (or median, etc.) editing time for the first portion of editing jobs from the batch job. For instance, if the first portion of editing jobs from the batch job includes ten (10) editing jobs that are provided to ten (10) preferred editors, the processing system 110 can average the editing time received from the ten (10) preferred editors and calculate the word price based on the averaged editing time. Additionally, a mechanism may be provided to remove wrong time recordings (e.g., time recordings that are too long due to the post editor taking a break, etc.). The very high and very low values (outliers) may be removed from the dataset.

With regard to the calculation of the reduced risk word price, the following exemplary methodology may be used. Exemplary factors that may be considered to determine a reduced risk word price (e.g., a fair price calculation) include: 1) htWP—which can be a variable based on the type of content being edited and/or translated (generic, legal, technological, medical, and the like), which may correspond to the average buying price (e.g., USD); 2) hts—which can be a human editing and/or translation speed which can be determined based on the first percentage or portion of editing jobs from the batch job (e.g., words/day); 3) rev—which can be the daily revenue the editor and/or translator expects to have as daily income (e.g., USD); 4) pes—which can be the editing time and can be determined based on the first editing job, or the first percentage or portion of editing jobs from the batch job (e.g., words/day). The rev may be determined based on the formula hts*htWP. The reduced risk word price can be calculated using the formula hts*htWP/pes. The translation speed that is estimated is hts, and pes is what is measured in the benchmark process. Both variables are typically expressed in the same manner (e.g., words per hour or words per day).

In one example, for a htWP of 0.10 USD, a hts of 2,500 words/day, a rev of 250 USD, and a pes of 7,000 words/day, the reduced risk word price can be 0.0357 USD. Since the editing time and/or production speed can be higher, the reduced risk word price can be expressed as x.xxx (i.e., three (3) decimals after the separator).

Other pricing schema may also be included in, or otherwise be used to calculate or modify the reduced-risk word price, e.g., the dynamic pricing schema, the stacked pricing schema, the QC corrected pricing schema, and/or the bonus pricing schema, discussed herein.

Figure 3:
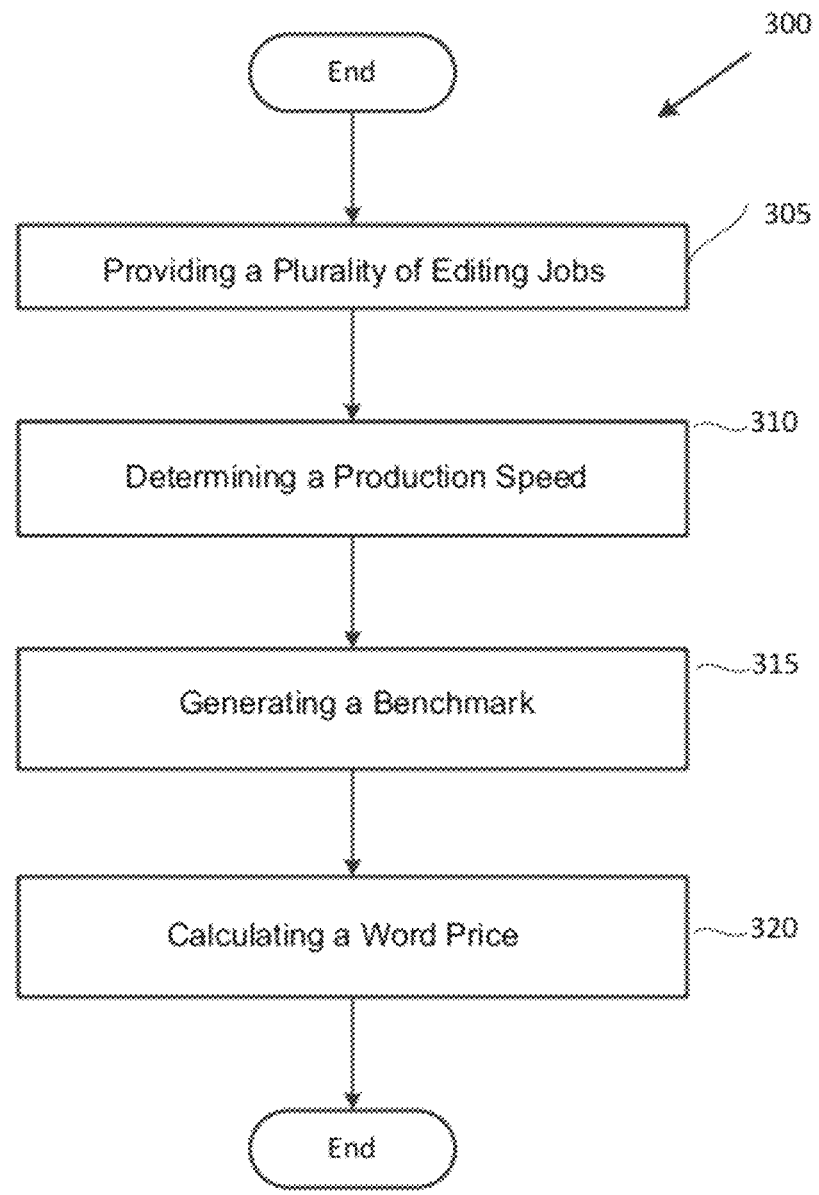
FIG. 3 is a flowchart of another example of a method for determining a risk-reduced word price for editing an editing job, in accordance with the present disclosure.

Turning now to FIG. 3, shown therein is a method 300 for determining a risk-reduced word price for editing, e.g., for post-translation editing. Generally speaking, the steps of the method 300 are performed by the processing system 110 (e.g., a web server). One of ordinary skill in the art will appreciate that the processing system 110 can be implemented as a plurality of web servers, i.e., the steps of the method 300 may also occur on one or more web servers, one or more presentation servers, or across a distributed computing system such as a cloud computing system, and the like.

The method 300 may include the step 305 of providing, by a processing system 110 operating on a network 115, to one or more editors a plurality of editing jobs from a batch job. It is to be understood that the term "editor" or "editors" used herein, as opposed to "preferred editor" or "preferred editors," can generally refer to editors who may not have established a proven record of editing the editing jobs at a predetermined editing time, a predetermined editing quantity, and/or a predetermined editing quality. In some aspects, the editors provided the first portion or percentage of editing jobs from the batch job at step 305 can be a preferred editor or can be an editor.

The method 300 may include the step 310 of determining, in real time by the processing system, a production speed of the one or more editors editing a first percentage of the editing jobs. The production speed may be determined by being received from the user interface 105. The processing system 110 can include a timing module and/or a quality module adapted to monitor and record the production speed of the editor editing the editing job.

As discussed above, the production speed can be indicative of the editing time it took the editor to edit the editing job and also the number of words in the editing job. The production speed can also be indicative of the editing quality of the editor editing the editing job. Generally, the editing quality can be understood to refer to how many mistakes remain in the edited editing job once the editor has finished editing the editing job. For example, if the editor identifies and corrects 90 out of 100 mistakes in the editing job, that editor can be said to have an editing quality of 90 percent. As a generalization this may be acceptable; however, in some embodiments an actionable scale is used to identify the QL.

In some exemplary embodiments, the editing quality can refer to the appropriateness of the editor's edits. Exemplary appropriate edits can refer to the proper usage of contractions, phraseology, corrections in language differences, and the like. An editor who uses the appropriate edits 9 out of 10 times can also be said to have an editing quality of 90 percent. In the case of preferred editors, the preferred editors editing quality can previously be established with some degree of certainty. For example, an editor who has been provided 100 editing jobs and has returned 95 of the editing jobs with an editing quality of 90 percent or better can be said to have an editing quality of at least 90 percent. The editing quality can be determined based on an evaluation, by either a human or a machine, of the edited editing job received from the editor.

The method 300 may include the step 315 of generating, by the processing system, a benchmark based on the production speed of the one or more editors editing the first portion of editing jobs. A benchmark can generally be understood to refer to a number or factor indicative of the combination of the production speed, the editing time, and/or the editing quality. The benchmark can refer to a number or factor indicative of the production speed, the editing time, and/or the editing quality of one or more preferred editors. A benchmark can refer to a standard or reference, derived from the editing time and the editing quality, by which other editors can be measured.

The method 300 can include the step 320 of calculating, by the processing system, a word price for editing a remaining portion of editing jobs of the batch job based on the benchmark. The benchmark, based on the production speed, the editing time, and/or the editing quality, can be a number or reference from which can be derived the amount of time needed for an editor to edit a remaining portion of the editing jobs, at a predetermined editing quality. Using the benchmark, the processing system 110 can determine the amount of time needed for an editor to edit the remaining portion of the editing jobs and adjust the word price accordingly. For instance, for a relatively simple editing job, the word price can be lowered, whereas for a more difficult editing job, the word price can be raised.

Turning now to a more particular aspect of the presently disclosed inventive concepts, the following example is provided by way of example only. The following example is not intended to be limiting of the presently disclosed inventive concepts. More particularly, changes to the example described below as well as the description above are considered within the scope of the present disclosure.

Figure 4A:
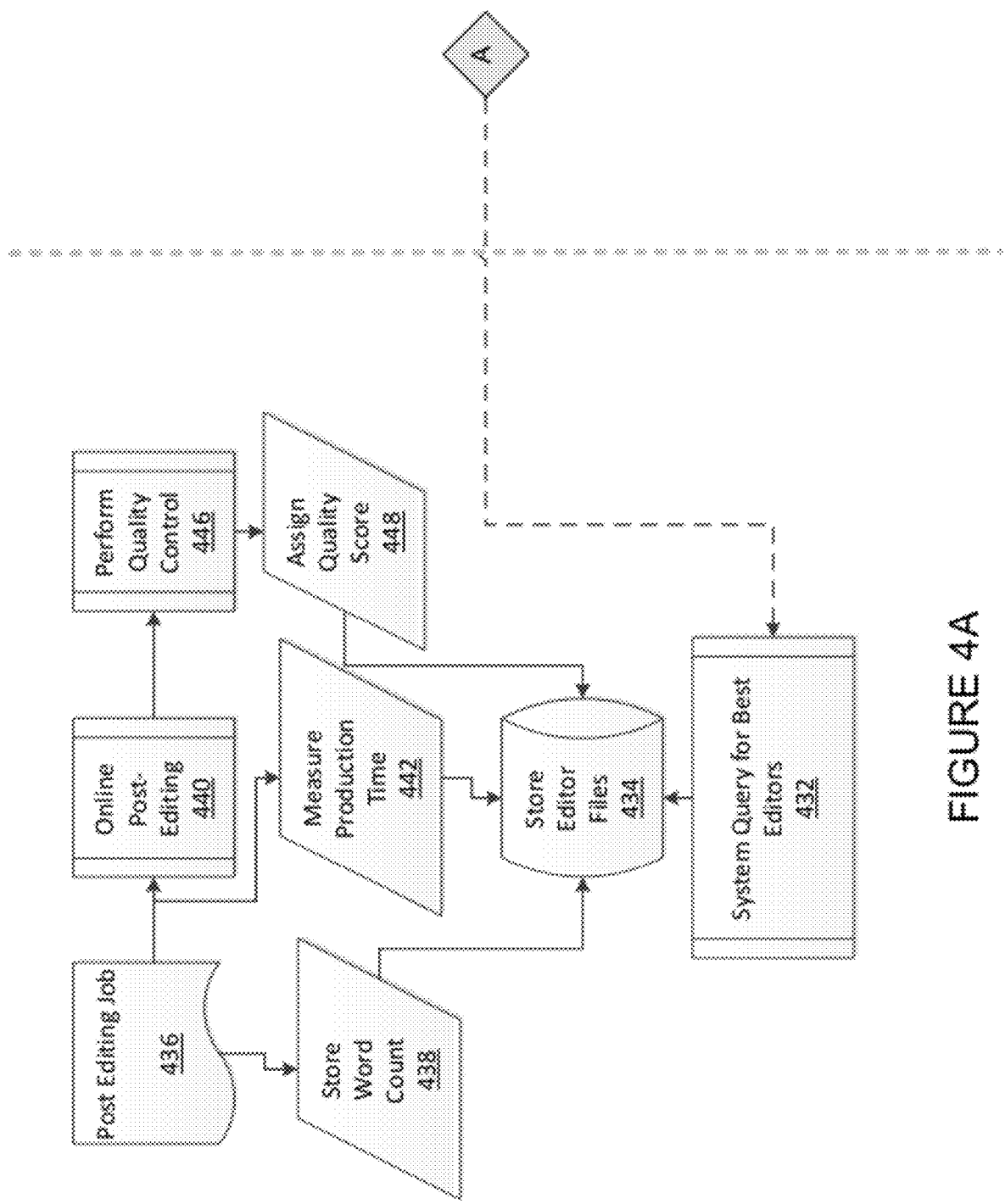
FIG. 4A is a schematic diagram illustrating various aspects of determining a risk-reduced word price for editing an editing job, in accordance with the present disclosure.
Figure 4B:
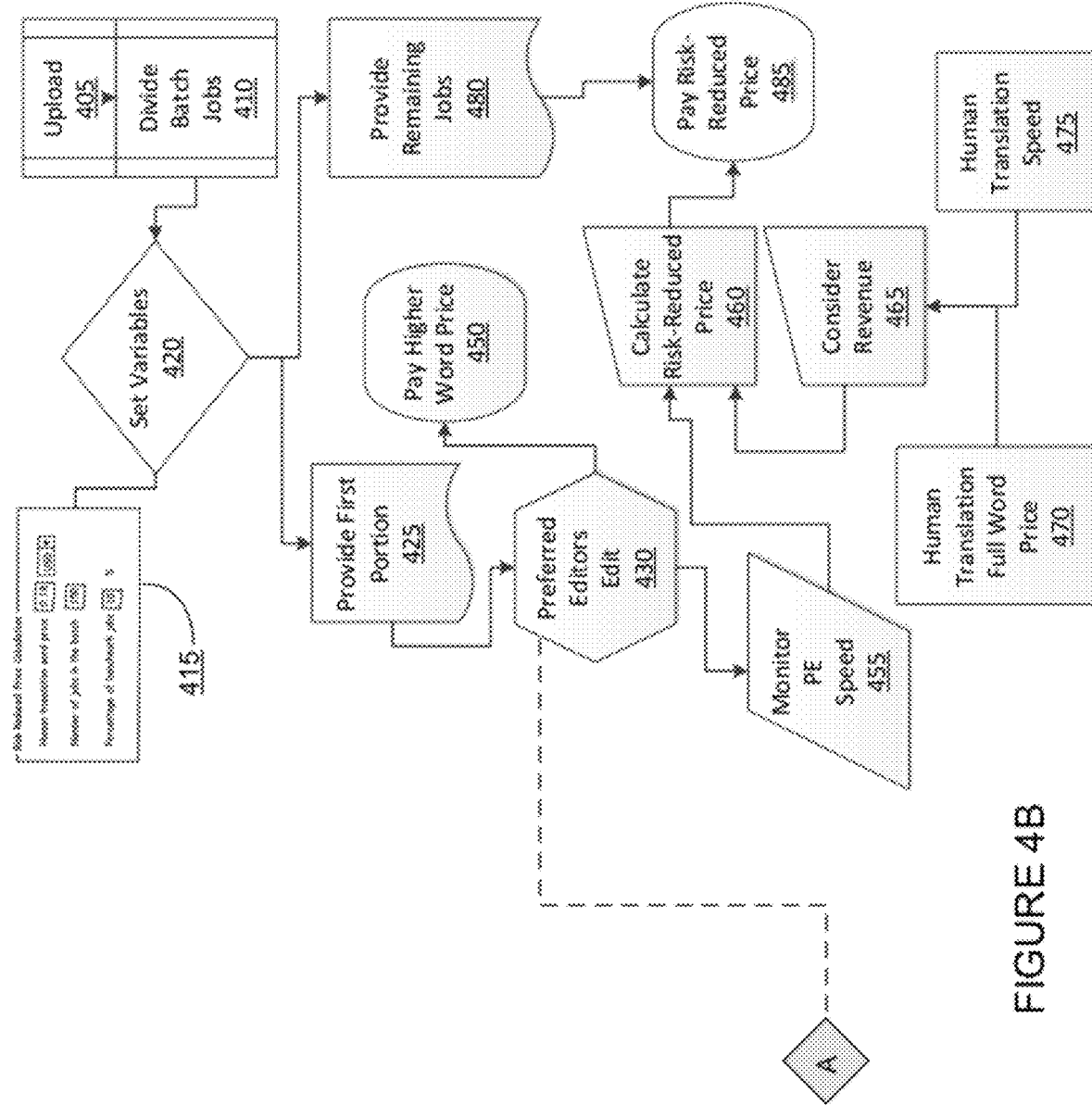
FIG. 4B is a schematic diagram, and a continuation of FIG. 4A, illustrating various aspects of determining a risk-reduced word price for editing an editing job, in accordance with the present disclosure.

Referring now to FIGS. 4A and 4B collectively, shown therein is a diagram illustrating one example of certain aspects of systems and methods adapted to determine a risk-reduced word price for editing. Note that FIG. 4A and FIG. 4B are connected by off-page connector A.

Beginning at 405, a batch job may be uploaded, provided to, or otherwise made available to the processing system 110. In some embodiments, for the benchmarking to be valid, the various jobs in the batch should come from the same universe and should be machine-translated by the same system.

At 410, the batch job can be broken down, or otherwise divided into a plurality of editing jobs. The editing jobs of the batch job can be broken down or divided into individual editing jobs that can be provided to the one or more editors or preferred editors for editing. The editing jobs can include a unique identification indicating which batch job the editing job originated from.

At 415, the variables can be determined. The variables can be determined by the processing system 110 and/or by an administrator using the processing system 110. Exemplary variables can include a human translation word price, a number of editing jobs in the batch job, and a percentage of the editing jobs to be set aside as benchmark jobs (i.e., the first portion of editing jobs or the first editing job).

At 420, the variables and benchmark size can be set for the batch job. The processing system 110 can utilize the variables and the percentage of benchmark jobs to set aside the benchmark jobs for editing by the editors and/or the preferred editors. For instance, if the number of editing jobs in the batch job is 150 and the percentage of benchmark jobs is 10 percent, then the processing system 110 can set aside or otherwise designate 15 editing jobs as the benchmark jobs (as the first editing job or as the first portion or percentage of editing jobs).

At 425, the processing system 110 can make available or otherwise provide the first portion of editing jobs to the preferred editors. In the example discussed above, the processing system 110 provides, for example, 10 percent, or 15 of the editing jobs to the preferred editors to edit. At 430, the preferred editors edit the first portion of editing jobs (e.g., the benchmark jobs). The processing system 110 can query an editor profile database to select the preferred editors/translators.

Turning now to exemplary methods for determining/selecting preferred editors, at 432 the processing system 110 queries and selects the preferred editors to edit the first portion or percentage of editing jobs or the benchmark jobs. The preferred editors can be selected based on the sum of the editing quantity multiplied by the average editing quality. For editors with a sum above a predetermined value, these editors can be considered preferred editors and therefore be provided the first portion of editing jobs. An editor's profile database 434 can store information indicative of the past performance of editors. This information may indicate, e.g., which editors can be considered preferred editors. In some embodiments, it is determined how many jobs various editors submit, how stable the quality of their work is, and if the quality of their work is always greater than the requested QL.

With regard to the past performance of editors that can be used to identify preferred editors, i.e., the creation and/or collection of exemplary information for the editors, an example of past performance steps can be found with reference to 436-448. Previously, at 436, the processing system 110 can post an editing job or otherwise make the editing job available to an editor. The processing system stores the editing quantity of the posted editing job at 438, (e.g., the word count of the editing job). At 440, the editor may edit the editing job. The editor may edit the editing job online, e.g., through a series of web pages provided by the processing system 110. The processing system can measure the production time, e.g., the editing time, of the editor editing the editing job at 442. At 446 the editing job edited by the editor can be delivered or otherwise provided to the processing system 110 for a quality control check. A quality score may be assigned to the edited job provided by the editor at 448. The registered time may be corrected, by, for example, removing very high and very low time registrations.

The qualified associates or editors can pull or otherwise be provided editing jobs for which they are qualified. The jobs the editors submit can be quality checked. The processing system 110 can collect the metadata discussed above (e.g., word count, production time, and quality score) in real time which can be stored in the editors profile database 434. As would be understood, the information stored in the editors profile database 434 can be used to determine which editors are the preferred editors, who can then be provided the benchmark jobs (the first portion of editing jobs or the first editing job) and which editors are simply editors.

Returning now to 430 where the preferred editors edit the first portion of editing jobs, at 450 the preferred editors (i.e., the benchmarkers) can optionally be paid a higher word price for editing the first portion of editing jobs (e.g., the benchmark jobs). At 455, the processing system 110 can monitor and record, or otherwise receive or determine an editing time of the preferred editors editing the first portion of editing jobs. The editing time (e.g., PE speed) can be recorded or received in real-time (i.e., as the preferred editor edits the first portion of editing jobs). The editing time can be recorded online and then provided to the processing system 110. The editing time may be divided into segments wherein variant segments can be corrected to account for such things as the editor taking breaks. At 460, the risk-reduced word price can be calculated, using for example the methodology described above. In addition to the editing time from 455, the word price can be calculated based on other variables. For instance, in the field of post-translation editing, a human translation revenue can be considered at 465. The human translation revenue can be determined based on, for example, a human translation full word price 470 and a human translation speed 475.

Once the reduced-risk word price has been calculated at 460, the remaining portion of the editing jobs, or the second editing job can be provided or otherwise made available to one or more editors at 480. In the example discussed above, the remaining portion of editing jobs may be 90 percent. The editors can edit the remaining portion of editing jobs while being paid the newly calculated risk-reduced word price at 485. That is, in the example discussed above, 10 percent of the editing jobs can be provided to preferred editors at a higher word price and the remaining 90 percent of the editing jobs from the batch job can be provided to editors at the newly calculated reduced risk word price.

Turning now to additional considerations, primarily in the field of post-translation editing, the quality of a batch job created from a machine translation can generally only be determined when at least a portion of the editing jobs (e.g., the benchmark jobs) are actually edited. The presently disclosed concepts can permit an administrator of a processing system 110 to utilize preferred editors editing a percentage of the editing jobs from the batch job to determine the quality of the machine translation and then use that information to determine a reduced risk word price for editors editing the remaining portion of the editing jobs.

Benchmarking, such as online benchmarking for example, may be determined by measuring how long it takes for preferred editors to edit an editing job. The editing time can be measured per segment, wherein segments taking longer than other segments can be corrected for, e.g., in the case where a preferred editor takes a break. Generally, the production speed of the preferred editor editing the editing job can be the sum of all the segments divided by the number of words in the editing job. The production speed of the preferred editors can be used to generate a benchmark to define the risk-reduced word price for the remaining portion of editing jobs from the batch job. It is noteworthy that benchmarking need not be limited to online benchmarking in some embodiments.

Online benchmarking may be accomplished when the preferred editors utilize the processing system 110 online to edit the first portion of editing jobs. The processing system 110 may produce the benchmark data in real-time. The processing may determine when a predetermined percentage of the editing jobs have been completed and then calculate the production speed.

In accordance some aspects of the present disclosure, the risk-reduced word price can be dynamically adjusted as editors edit the editing jobs from the batch job. That is, the risk-reduced word price can be calculated once 10 percent of the editing jobs have been edited, can be recalculated when the next 10 percent (20 percent of the total) of the editing jobs have been edited, and so on. For example, the processing system 110 can provide the editing jobs from the batch job to editors and then monitor the editing time and/or production speed of the editors in real-time as they edit the editing jobs. In one example, the processing system 110 can recalculate the risk-reduced word price when 10 percent, 20 percent, 30 percent, and so on, of the editing jobs have been edited. In another example, the processing system can recalculate the risk-reduced word price when 20 percent, 40 percent, 60 percent, and again when 80 percent of the editing jobs from the batch job have been edited, based on the production speed of the editors.

In some embodiments, the risk-reduced price calculation method can be used in an iterative process, in order to have even less risk when more post-editing is done on a batch of jobs. First, the price on the first x % of the jobs (e.g., 10 out of 100) may be calculated. After y % (e.g., 30 out of 100) the same calculation is performed again, and the price for the remaining jobs is recalculated once more. When z % of the jobs are remaining (e.g., 20%) the calculation is performed once more. Metadata that is collected (PE time) can be used at any time to calculate a fair price for the remaining jobs in the batch.

Figure 5:
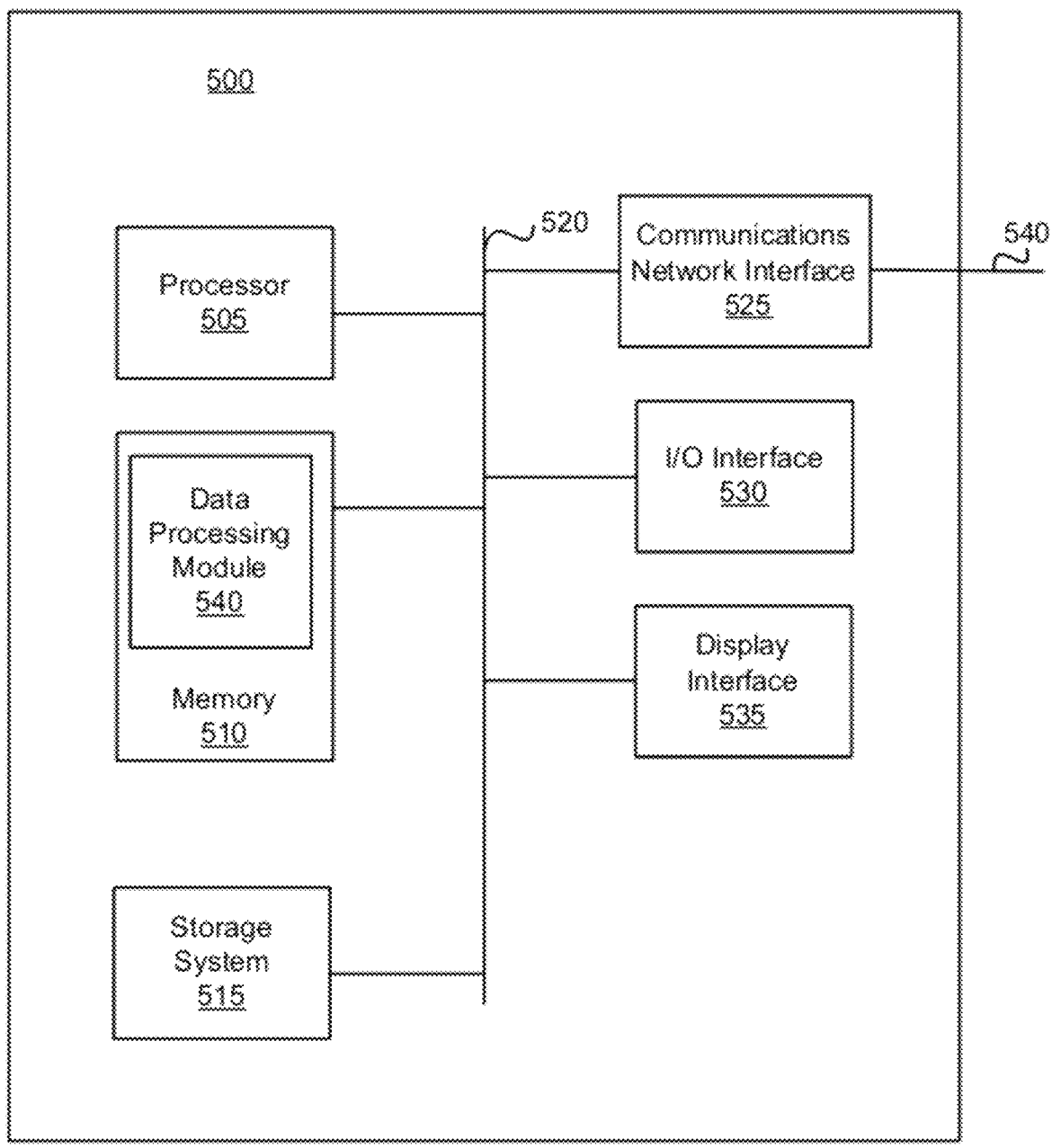
FIG. 5 is a block diagram of exemplary system for practicing embodiments according to the present disclosure.

Referring now to FIG. 5, shown therein is a block diagram of exemplary system 500 for practicing embodiments according to the present technology. The system 500 may be used to implement a device suitable for determining a reduced-risk word price for edits.

The system 500 of FIG. 5 may include one or more processors 505 and memory 510. The memory 510 may store, in part, instructions and data for execution by the processor 505. The memory 510 may store executable code when in operation. The memory 510 may include a data processing module 540 for processing data. The system 500 may further include a storage system 515, communications network interface 525, input and output (I/O) interface(s) 530, and display interface 535.

The components shown in FIG. 5 are depicted as being communicatively coupled via a bus 520. The components may be communicatively coupled via one or more data transport means. The processor 505 and memory 510 may be communicatively coupled via a local microprocessor bus, and the storage system 515 and display interface 535 may be communicatively coupled via one or more input/output (I/O) buses. The communications network interface 525 may communicate with other digital devices (not shown) via a communications medium.

The storage system 515 may include a mass storage device and portable storage medium drive(s). The mass storage device may be implemented with a magnetic disk drive or an optical disk drive, which may be a non-volatile storage device for storing data and instructions for use by the processor 505. The mass storage device can store system software for implementing embodiments according to the present technology for purposes of loading that software into the memory 510. Some examples of the memory 510 may include RAM and ROM.

A portable storage device, as part of the storage system 515, may operate in conjunction with a portable non-volatile storage medium, such as a floppy disk, compact disk or digital video disc (DVD), to input and output data and code to and from the system 500 of FIG. 5. System software for implementing embodiments of the present invention may be stored on such a portable medium and input to the system 500 via the portable storage device.

The memory and storage system of the system 500 may include a non-transitory computer-readable storage medium having stored thereon instructions executable by a processor to perform a method for determining a reduced-risk word price. The instructions may include software used to implement modules discussed herein, and other modules.

I/O interfaces 530 may provide a portion of a user interface, receive audio input (via a microphone), and provide audio output (via a speaker). The I/O interfaces 530 may include an alpha-numeric keypad, such as a keyboard, for inputting alpha-numeric and other information, or a pointing device, such as a mouse, trackball, stylus, or cursor direction keys.

The display interface 535 may include a liquid crystal display (LCD) or other suitable display device. The display interface 535 may receive textual and graphical information, and process the information for output to the display interface 535.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "non-transitory computer-readable storage medium" and "non-transitory computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a PROM, an EPROM, an EEPROM, a flash EEPROM, a non-flash EEPROM, any other memory chip or cartridge, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

An exemplary computing system may be used to implement various embodiments of the systems and methods disclosed herein. The computing system may include one or more processors and memory. The memory may include a computer-readable storage medium. Common forms of computer-readable storage media include, for example, a floppy disk, a flexible disk, a hard disk, magnetic tape, any other magnetic medium, a CD-ROM disk, DVD, various forms of volatile memory, non-volatile memory that can be electrically erased and rewritten. Examples of such non-volatile memory include NAND flash and NOR flash and any other optical medium, the memory is described in the context of. The memory can also comprise various other memory technologies as they become available in the future.

Main memory stores, in part, instructions and data for execution by a processor to cause the computing system to control the operation of the various elements in the systems described herein to provide the functionality of certain embodiments. Main memory may include a number of memories including a main random access memory (RAM) for storage of instructions and data during program execution and a read only memory (ROM) in which fixed instructions are stored. Main memory may store executable code when in operation. The system further may include a mass storage device, portable storage medium drive(s), output devices, user input devices, a graphics display, and peripheral devices. The components may be connected via a single bus. Alternatively, the components may be connected via multiple buses. The components may be connected through one or more data transport means. Processor unit and main memory may be connected via a local microprocessor bus, and the mass storage device, peripheral device(s), portable storage device, and display system may be connected via one or more input/output (I/O) buses.

Mass storage device, which may be implemented with a magnetic disk drive or an optical disk drive, may be a non-volatile storage device for storing data and instructions for use by the processor unit. Mass storage device may store the system software for implementing various embodiments of the disclosed systems and methods for purposes of loading that software into the main memory. Portable storage devices may operate in conjunction with a portable non-volatile storage medium, such as a floppy disk, compact disk or DVD, to input and output data and code to and from the computing system. The system software for implementing various embodiments of the systems and methods disclosed herein may be stored on such a portable medium and input to the computing system via the portable storage device.

Input devices may provide a portion of a user interface. Input devices may include an alpha-numeric keypad, such as a keyboard, for inputting alpha-numeric and other information, or a pointing device, such as a mouse, a trackball, stylus, or cursor direction keys. In general, the term input device is intended to include all possible types of devices and ways to input information into the computing system. Additionally, the system may include output devices. Suitable output devices include speakers, printers, network interfaces, and monitors. Display system may include a liquid crystal display (LCD) or other suitable display device. Display system may receive textual and graphical information, and processes the information for output to the display device. In general, use of the term output device is intended to include all possible types of devices and ways to output information from the computing system to the user or to another machine or computing system.

Peripherals may include any type of computer support device to add additional functionality to the computing system. Peripheral device(s) may include a modem or a router or other type of component to provide an interface to a communication network. The communication network may comprise many interconnected computing systems and communication links. The communication links may be wireline links, optical links, wireless links, or any other mechanisms for communication of information. The components contained in the computing system may be those typically found in computing systems that may be suitable for use with embodiments of the systems and methods disclosed herein and are intended to represent a broad category of such computing components that are well known in the art. Thus, the computing system may be a personal computer, hand held computing device, telephone, mobile computing device, workstation, server, minicomputer, mainframe computer, or any other computing device. The computer may also include different bus configurations, networked platforms, multi-processor platforms, etc.

Various operating systems may be used including Unix, Linux, Windows, Macintosh OS, Palm OS, and other suitable operating systems. Due to the ever changing nature of computers and networks, the description of the computing system is intended only as a specific example for purposes of describing embodiments. Many other configurations of the computing system are possible having more or fewer components.

It is noteworthy that various modules and engines may be located in different places in various embodiments. Modules and engines mentioned herein can be stored as software, firmware, hardware, as a combination, or in various other ways. It is contemplated that various modules and engines can be removed or included in other suitable locations besides those locations specifically disclosed herein. In various embodiments, additional modules and engines can be included in the exemplary embodiments described herein.

The foregoing detailed description of the technology herein has been presented for purposes of illustration and description. It is not intended to be exhaustive or to limit the technology to the precise form disclosed. Many modifications and variations are possible in light of the above teaching. For example, software modules and engines discussed herein may be combined, expanded into multiple modules and engines, communicate with any other software module(s) and engine(s), and otherwise may be implemented in other configurations. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for improving machine translation quality by post-translation editing of a machine translation, the method comprising:

providing, from a processing system coupled via the Internet to a plurality of user interfaces, a first post-translation editing job from a machine translation of a batch job, each user interface configured for use by an editor for editing the first post-translation editing job;

recording post-translation editing information including a number of words and an editing time indicative of the time taken by each of the editors, the recording performed by an application stored on each of the user interfaces;
monitoring via the Internet the real-time use of each user interface by the respective editor of a plurality of editors, the monitoring performed by the processing system in real time, the monitoring including:
receiving, via the Internet, the recorded post-translation editing information including a number of words and editing time from each of the applications stored on the plurality of user interfaces, the post-translation editing information received from the applications in real time as the plurality of editors edit their respective first post-translation editing jobs, and
calculating for each of the plurality of editors a production speed based on the received number of words and editing time, the calculation performed in real time as the plurality of editors edit their respective first post-translation editing jobs, the calculating performed by a timing module communicatively coupled via the internet to each of the user interfaces;
correcting, by the processing system, the calculated production speed for periods indicating inactivity of the editor;
performing, by the processing system, a machine calculation of the quality of the post-translation editing;
selecting one or more of the plurality of user interfaces and associated editors based on a function of the production speed and quality of the monitored first post-translation editing jobs; and
providing a second post-translation editing job from the processing system to the one or more selected user interfaces and associated editors.

2. The method of claim 1, further comprising determining a production speed of the plurality of editors based on the editing time measured per segment.

3. The method of claim 2, wherein the production speed is determined based on the sum of the editing times for all the segments in the post-translation editing job divided by the number of words in the post-translation editing job.

4. The method of claim 1, further comprising receiving an editing time from the editors editing the second post-translation editing job.

5. The method of claim 1, further comprising:
receiving an editing time and word count in real time from the plurality of editors while editing the second post-translation editing job; and
dynamically a word price in real time based on the word count and editing time received from the plurality of editors editing the second post-translation editing job, the plurality of editors editing a remaining portion of the post-translation editing jobs while being paid the dynamically calculated word price.

6. The method of claim 1, further comprising calculating an amount of time for at least one of the plurality of editors to edit the remaining portion of the provided post-translation editing job.

7. The method of claim 1, further comprises calculating a word price based on an expected daily revenue for at least one of the plurality of editors.

8. The method of claim 1, further comprising correcting the editing time to account for breaks by one or more editors.

9. The method of claim 1, wherein the determining of the editing time for the first group of one or more editors to edit the first editing job is determined after a predetermined percentage of the first editing job is complete.

10. A system for improving post-translation editing of a machine translation of a batch job, the system comprising:
a machine translator to output machine translated content;
hardware and logic stored on one or more user interfaces for recording metadata including a number of words and an editing time indicative of the time taken by editors associated with the respective user interfaces for a number of words; and
a processing system coupled via the Internet to the one or more user interfaces and having instructions stored on non-transitory computer-readable medium that when executed cause the processing system to:
receive a batch of machine translated content from the machine translator;
assign a quality level to the machine translated batch job;
provide from the processing system to the one or more user interfaces of one or more preferred editors a first portion of post-translation editing jobs from the machine translated batch job;
receive, via the Internet, from the hardware and logic stored on the each of the one or more user interfaces, recorded metadata including the number of words and the editing time, the metadata received from the user interface hardware and logic in real time as the one or more preferred editors edit the first post-translation editing jobs;
determine a production speed of the one or more preferred editors editing the first portion of the post-translation editing jobs, the production speed being calculated from the received editing time and number of words edited in real time by the stored hardware and logic to track the editing time at each editor user interface as the one or more preferred editors edit the first portion of post-translation editing jobs;
determine a quality of the first portion of post-translation editing jobs;
adjust the calculated production speed to correct for periods of inactivity of the one or more preferred editors;
select a user interface and associated editor from the one or more user interfaces and associated editors based on a function of the quality level of the machine translation output, the production speed, and the quality of the first portion of post-translation editing jobs; and
provide a second portion of the post-translation editing jobs from the machine translated batch job to the selected user interface and associated editor based on the adjusted production speed.

11. The system of claim 10, wherein the executed instructions further cause the processing system to determine a second production speed of the editor editing the second portion of the post-translation editing jobs provided to the selected user interface.

12. The system of claim 11, wherein the executed instructions further cause the processing system to calculate a word price for a remaining portion of the post-translation editing jobs based on the second production speed.

13. The system of claim 11, wherein the executed instructions further cause the processing system to calculate a word price for a remaining portion of the post-translation editing jobs based on the production speed and the second production speed.

14. The system of claim 11, wherein the executed instructions further cause the processing system to calculate a word price based on the production speed of the one or more preferred editors editing the post-translation editing jobs.

15. The system of claim 10, wherein the executed instructions further cause the processing system to determine the production speed based on the number of words in the editing job and the editing time it takes the editor to edit the post-translation editing jobs.

16. The system of claim 10, wherein the production speed is determined after the editor has edited the post-translation editing jobs.

17. The system of claim 14, wherein calculating the word price is further comprising calculating the word price based on a bonus pricing schema comprising increasing a previous word price based on correction of particular mistakes.

18. A method for determining a distribution of post-translation editing of a machine translation of a batch job, the method comprising the steps of:

provided from a processing system operating on a network, to a first and second editor a first post-translation editing job from the machine translation of the batch job having a base quality level, the first and second editors each using a user interface for editing post-translation editing jobs, the processing system including hardware and logic stored on the processing system for recording post-translation editing information including a number of words and an editing time indicative of the time taken by each of the editors, the first post-translation editing job provided to each user interface via the network;

monitoring, in real time by the processing system via the network, each of the first and second user interfaces to determine a production speed of the first and second editors from the recorded number of words and editing time while the first and second editors edit the first post-translation editing jobs, the production speed determined when a predetermined percentage of the first post-translation editing jobs have been completed;

performing a machine calculation of a quality level of the editing by the first and second editor the machine calculation performed by the processing system;

calculating, by the processing system as an editor is editing, a benchmark in real-time for each of the first and second editors while the first and second editors are editing the first post-translation editing jobs, the calculation of the benchmarks based on the base quality level of the machine translation, the production speed and quality level of the editing by the first editor, and the production speed and quality level of the editing by the second editor while editing the first post-translation editing job;

determining whether to distribute a second post-translation editing job to the first editor, the second editor, or the first and second editors based on the benchmarks, the determination performed by the processing system; and distributing the second post-translation editing job from the processing system to the first editor, the second editor, or the first and second editors based on the determination, the distribution performed by the processing system.

19. The method of claim 18, wherein the production speed is determined based on the number of words in the editing job and an editing time it takes the editor to edit the editing job.

20. The method of claim 18, further comprising calculating a word price based on a bonus pricing schema comprising increasing the word price based on correction of particular mistakes.

* * * * *